United States Patent
Khoshnevisan et al.

(10) Patent No.: US 12,506,575 B2
(45) Date of Patent: Dec. 23, 2025

(54) DYNAMIC SWITCHING BETWEEN ASYMMETRIC PANELS FOR CODEBOOK BASED PHYSICAL UPLINK SHARED CHANNEL TRANSMISSION

(71) Applicant: QUALCOMM Incorporated, San Diego, CA (US)

(72) Inventors: Mostafa Khoshnevisan, San Diego, CA (US); Yitao Chen, San Diego, CA (US); Xiaoxia Zhang, San Diego, CA (US); Peter Gaal, San Diego, CA (US); Tao Luo, San Diego, CA (US); Yi Huang, San Diego, CA (US)

( * ) Notice: Subject to any disclaimer, the term of this patent is extended or adjusted under 35 U.S.C. 154(b) by 347 days.

(21) Appl. No.: 18/352,141

(22) Filed: Jul. 13, 2023

(65) Prior Publication Data

US 2024/0259152 A1    Aug. 1, 2024

Related U.S. Application Data

(60) Provisional application No. 63/481,775, filed on Jan. 26, 2023.

(51) Int. Cl.
*H04W 72/04* (2023.01)
*H04L 5/00* (2006.01)
(Continued)

(52) U.S. Cl.
CPC .......... *H04L 5/0048* (2013.01); *H04L 5/0055* (2013.01)

(58) Field of Classification Search
None
See application file for complete search history.

(56) References Cited

U.S. PATENT DOCUMENTS

| | | | |
|---|---|---|---|
| 2022/0322393 A1 | 10/2022 | Lin et al. | |
| 2023/0111064 A1* | 4/2023 | Rahman | H04B 7/0404 370/252 |
| 2024/0421961 A1* | 12/2024 | Liu | H04L 5/0053 |

FOREIGN PATENT DOCUMENTS

EP    4090063 A1    11/2022

OTHER PUBLICATIONS

Huawei, et al., "Codebook Based Transmission For UL MIMO", 3GPP TSG RAN WG1 Meeting #89, R1-1708130, 3rd Generation Partnership Project, Mobile Competence Centre, 650, Route Des Lucioles, F-06921 Sophia-Antipolis Cedex, France, vol. RAN WG1, No. Hangzhou, China, May 15, 2017-May 19, 2017, May 14, 2017, 9 pages, XP051273326, Sections 1 and 2.
(Continued)

*Primary Examiner* — Maharishi V Khirodhar

(57) ABSTRACT

Certain aspects of the present disclosure provide techniques for method for wireless communications by a user equipment (UE), generally including receiving, from a network entity, a configuration of one or more sounding reference signals (SRS) resources for codebook-based physical uplink shared channel (PUSCH) transmissions, transmitting a report indicating a capability index associated with at least one downlink reference signal, transmitting the one or more of the SRS resources with an updated number of SRS ports associated with the capability index, if spatial relation information of the one or more of the SRS resources is associated with the downlink reference signal, receiving, from the network entity, signaling scheduling the UE to transmit a PUSCH based on one of the SRS resources, and transmitting the PUSCH with a number of PUSCH ports according to the updated number of SRS ports.

28 Claims, 15 Drawing Sheets

(51) Int. Cl.
*H04W 76/00* (2018.01)
*H04W 88/08* (2009.01)

(56) References Cited

OTHER PUBLICATIONS

International Search Report and Written Opinion—PCT/US2024/011996—ISA/EPO—May 7, 2024.

* cited by examiner

DYNAMIC SWITCHING BETWEEN ASYMMETRIC PANELS FOR CODEBOOK BASED PHYSICAL UPLINK SHARED CHANNEL TRANSMISSION

CROSS-REFERENCE TO RELATED APPLICATION

This application claims benefit of and priority to U.S. Provisional Application No. 63/481,775, filed Jan. 26, 2023, which is assigned to the assignee hereof and hereby expressly incorporated by reference in its entirety as if fully set forth below and for all applicable purposes.

BACKGROUND

Field of the Disclosure

Aspects of the present disclosure relate to wireless communications, and more particularly, to techniques for efficiently switching between antenna panels for uplink transmissions.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications by a user equipment (UE). The method includes receiving, from a network entity, a configuration of one or more sounding reference signals (SRS) resources for codebook-based physical uplink shared channel (PUSCH) transmissions; transmitting a report indicating a capability index associated with at least one downlink reference signal; transmitting the one or more of the SRS resources with an updated number of SRS ports associated with the capability index, if spatial relation information of the one or more of the SRS resources is associated with the downlink reference signal; receiving, from the network entity, signaling scheduling the UE to transmit a PUSCH based on one of the SRS resources; and transmitting the PUSCH with a number of PUSCH ports according to the updated number of SRS ports.

Another aspect provides a method for wireless communications by a network entity. The method includes transmitting, for a UE, a configuration of one or more SRS resources for codebook-based PUSCH transmissions; receiving a report from the UE indicating a capability index associated with at least one downlink reference signal; receiving signals transmitted on one or more of the SRS resources with an updated number of SRS ports associated with the capability index, if spatial relation information of the one or more of the SRS resources is associated with the downlink reference signal; transmitting signaling scheduling the UE to transmit a PUSCH based on one of the SRS resources; and receiving the PUSCH transmitted with a number of PUSCH ports according to the updated number of SRS ports.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

DETAILED DESCRIPTION

Figure 1:
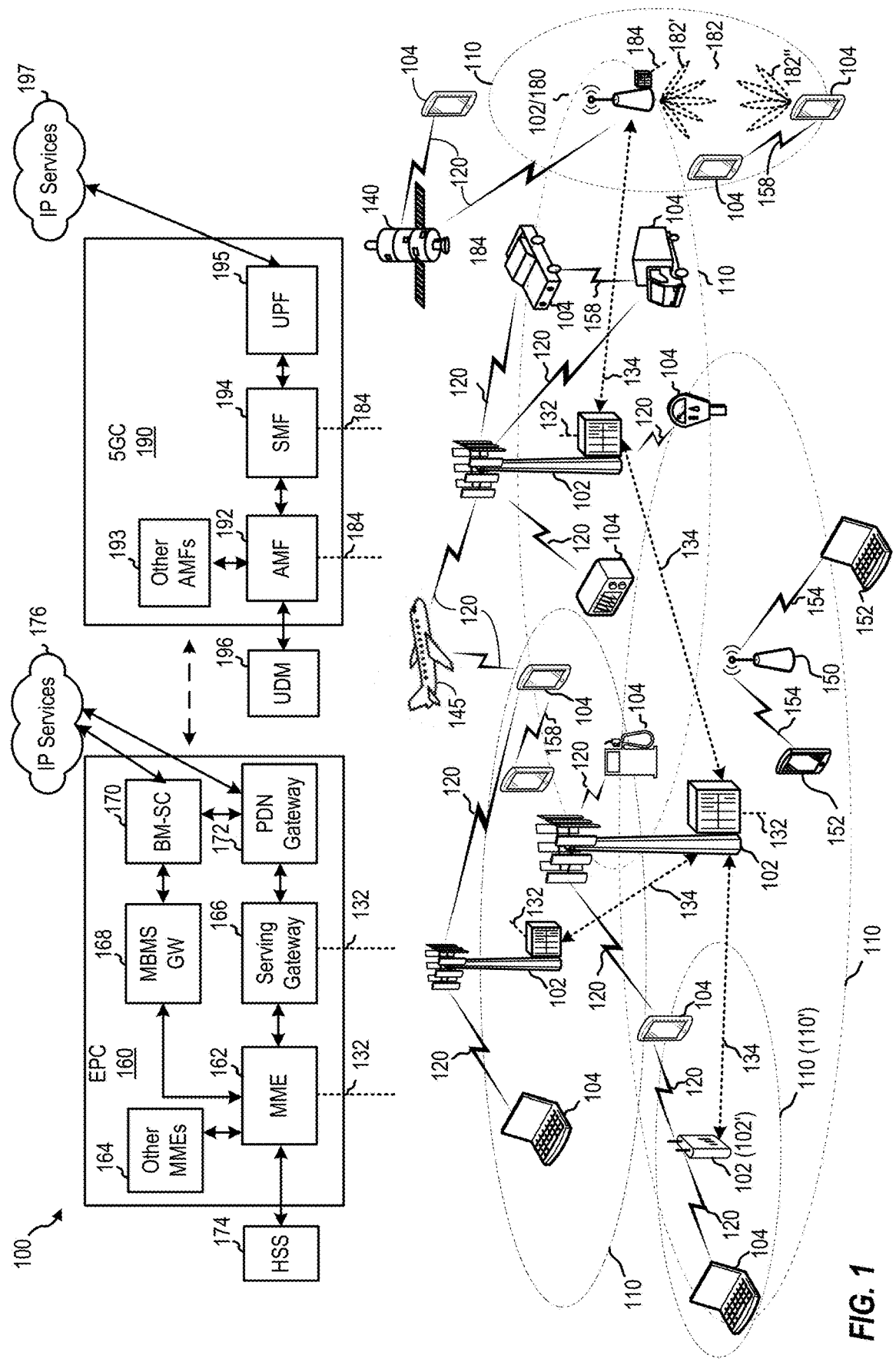
FIG. 1 depicts an example wireless communications network.

Aspects of the present disclosure provide apparatuses, methods, processing Aspects of the present disclosure relate to wireless communications, and more particularly, to techniques for efficiently switching between antenna panels for uplink transmissions.

Some wireless networks support codebook-based transmission and non-codebook-based transmission schemes for uplink transmissions. Codebook-based UL transmission is based on network configuration and can be used in cases where reciprocity may not hold.

For codebook-based uplink transmission, a UE may transmit (non-precoded) sounding reference signals (SRS) with up to 2 SRS resources (with each resource having 1, 2 or 4 ports). The network (e.g., a base station or gNB) measures the SRS and, based on the measurement, selects one SRS resource and a wideband precoder to be applied to the SRS ports within the selected resource. The network may configure the UE with the selected SRS resource via an SRS resource indictor (SRI) and with the wideband precoder via a transmit precoder matrix indicator (TPMI). For a dynamic grant, the SRI and TPMI may be configured via a downlink control information (DCI) with an uplink (UL) grant, for example, scheduling a physical uplink shared channel (PUSCH). The UE determines the selected SRS resource from the SRI and precoding from TPMI and transmits PUSCH accordingly.

In some cases, for codebook-based uplink transmission, a UE may be configured with one SRS resource set with "usage" set to "codebook." The SRS resource set may have up to 4 SRS resources and each SRS resource may be radio resource control (RRC) configured with a number of SRS ports. The SRI field in the UL DCI indicates one SRS resource, and the number of ports configured for the indicated SRS resource determines a number of antenna ports for PUSCH, which is typically transmitted with a same spatial domain filter (UL beam) as the indicated SRS resources. A number of layers (rank) and TPMI (precoder) for the scheduled PUSCH may be determined from a separate DCI field.

In some cases, a UE may indicate a maximum number of SRS ports it supports for a beam indicated in a beam report. For example, this indication may be provided via a reported capability index, perhaps based on a best antenna panel for reception (Rx) or transmission (Tx) of a beam. A gNB may schedule SRS for codebook-based PUSCH with a corresponding port number if UL sounding is needed, and will schedule PUSCH with a maximum layer number, limited by the port number. Unfortunately, this is typically only be possible with RRC-reconfiguration. Due to delays of RRC-reconfiguration, the best antenna panel for Rx/Tx of the beam may have changed by that time.

Aspects of the present disclosure, however, provide a signaling mechanism where a UE may dynamically indicate a reduced/increased number of SRS ports for PUSCH scheduling. The UE may then transmit one or more SRS resources with an updated number of SRS ports, receive signaling scheduling the UE to transmit a PUSCH based on one of the SRS resources, and transmit the PUSCH with a number of PUSCH ports according to the updated number of SRS ports.

The signaling mechanism proposed herein may, thus, allow for quicker updates, without the delays typically associated with RRC-reconfiguration. As a result, a UE may be able to optimize uplink transmission on an antenna beam panel, before a beam has changed, which may result in improved performance and user experience.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
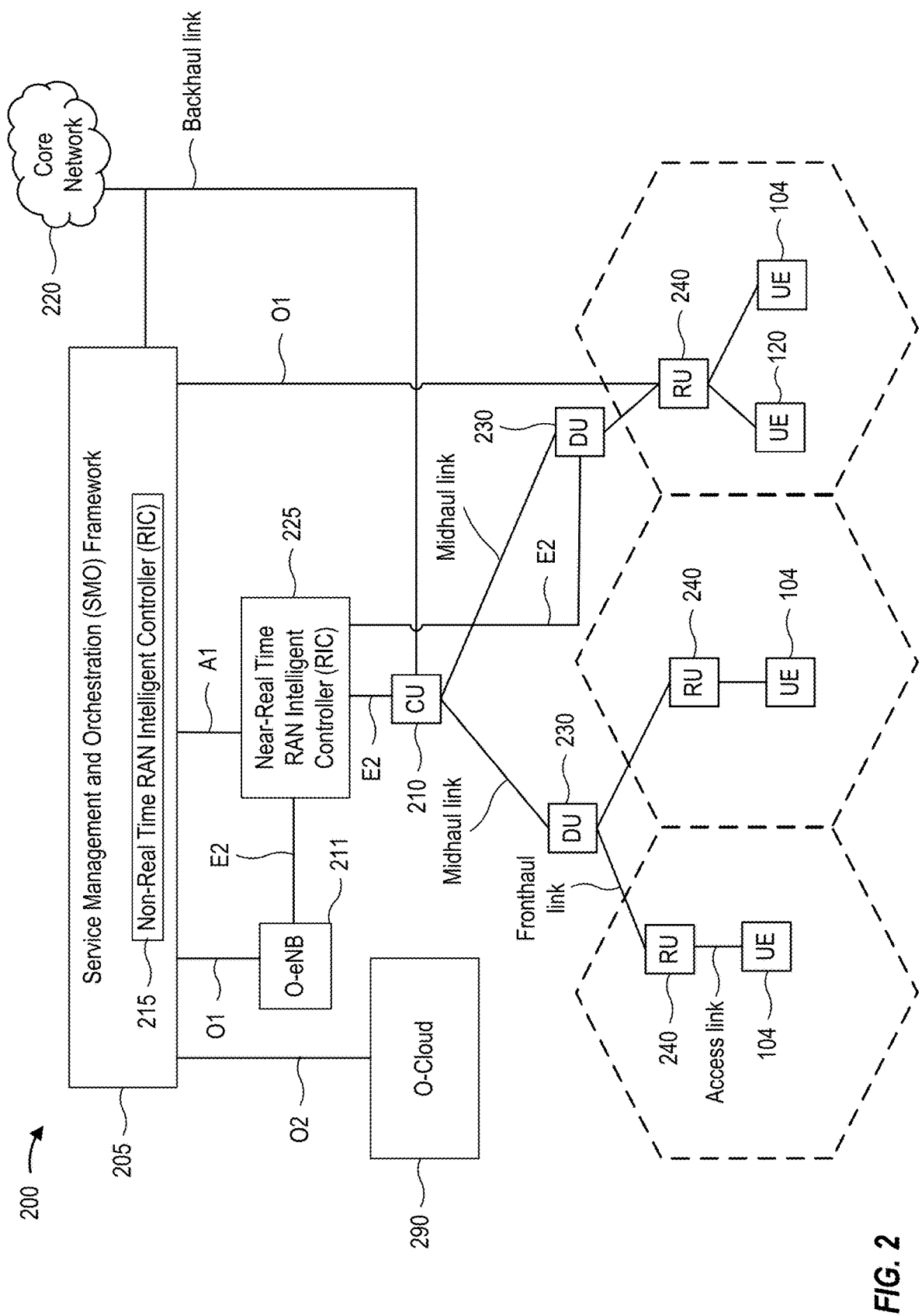
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QoS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
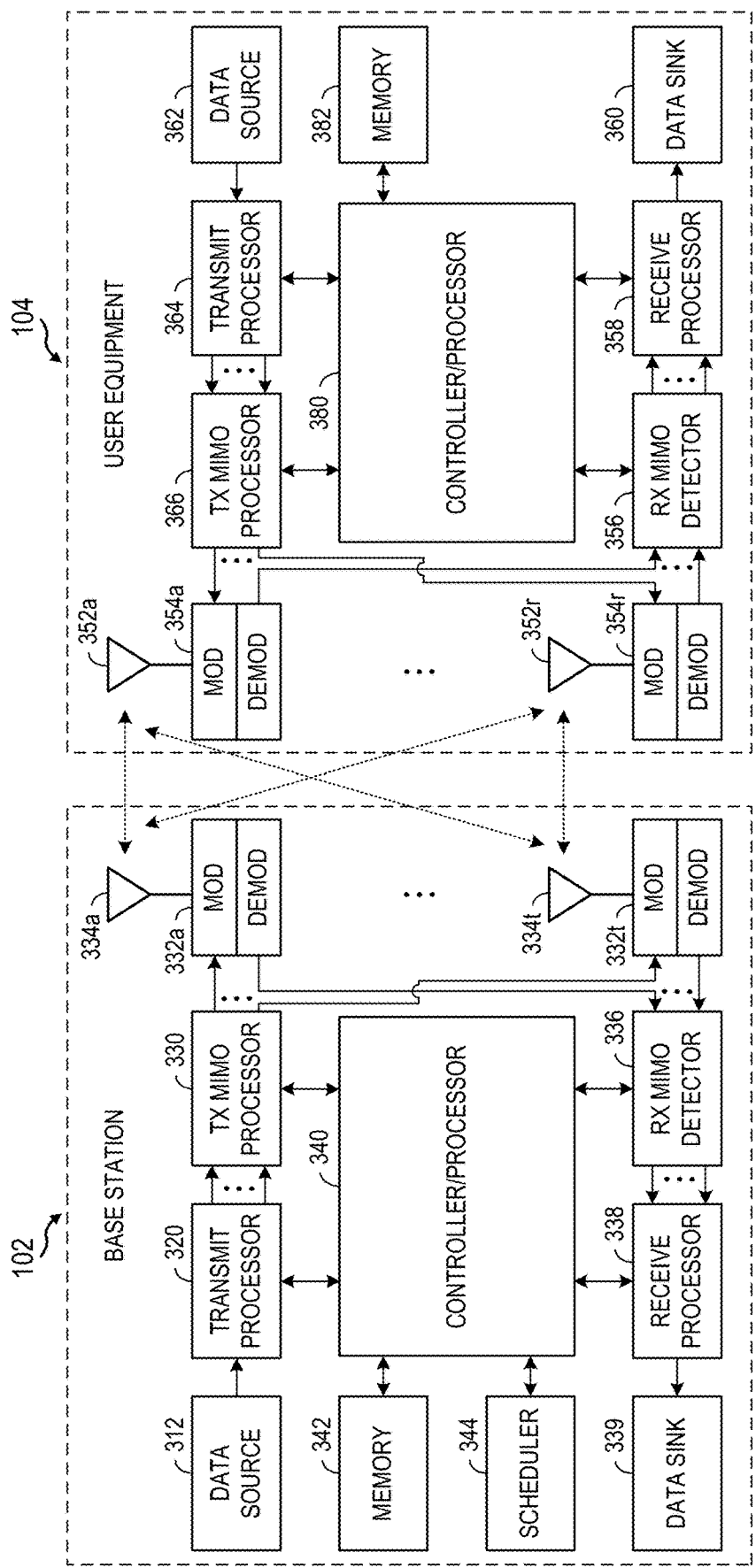
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334*a-t* (collectively 334), transceivers 332*a-t* (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352*a-r* (collectively 352), transceivers 354*a-r* (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332*a*-332*t*. Each modulator in transceivers 332*a*-332*t* may process a respective output symbol stream to obtain an output sample stream. Each modulator may further process (e.g., convert to analog, amplify, filter, and upconvert) the output sample stream to obtain a downlink signal. Downlink signals from the modulators in transceivers 332*a*-332*t* may be transmitted via the antennas 334*a*-334*t*, respectively.

In order to receive the downlink transmission, UE 104 includes antennas 352*a*-352*r* that may receive the downlink signals from the BS 102 and may provide received signals to the demodulators (DEMODs) in transceivers 354*a*-354*r*, respectively. Each demodulator in transceivers 354*a*-354*r* may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354*a*-354*r*, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354*a*-354*r* (e.g., for SC-FDM), and transmitted to BS 102.

At BS 102, the uplink signals from UE 104 may be received by antennas 334*a-t*, processed by the demodulators in transceivers 332*a*-332*t*, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332*a-t*, antenna 334*a-t*, and/or other aspects described herein. Similarly, "receiving" may refer to various mechanisms of obtaining data, such as obtaining data from antennas 334*a-t*, transceivers 332*a-t*, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354*a-t*, antenna 352*a-t*, and/or other aspects described herein. Similarly, "receiving" may refer to various mechanisms of obtaining data, such as obtaining data from antennas 352*a-t*, transceivers 354*a-t*, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
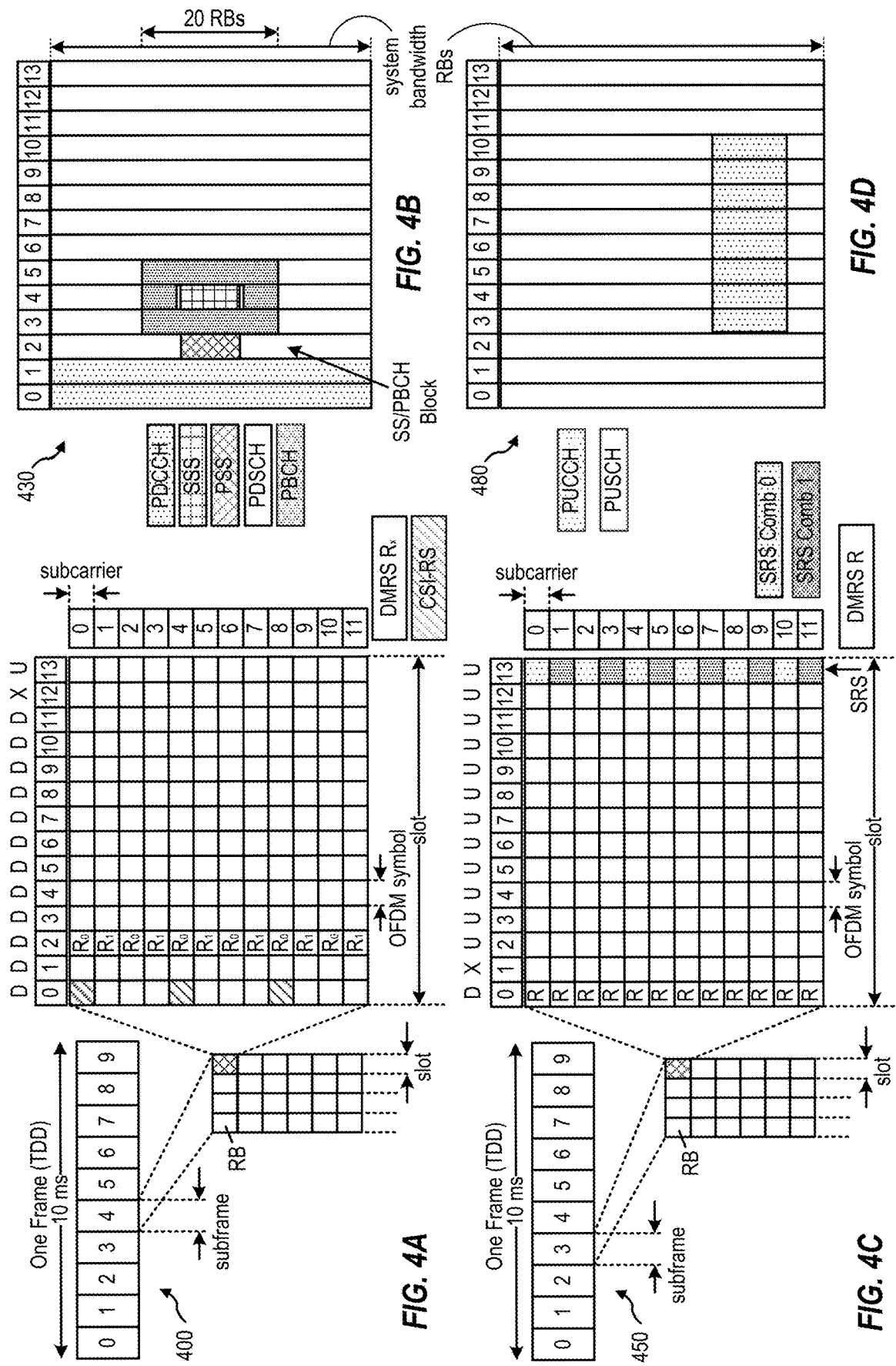
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot.

Other wireless communications technologies may have a different frame structure and/or different channels.

In certain aspects, the number of slots within a subframe is based on a slot configuration and a numerology. For example, for slot configuration 0, different numerologies (µ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and $2\mu$ slots/subframe. The subcarrier spacing and symbol length/duration are a function of the numerology. The subcarrier spacing may be equal to $2^\mu \times 15$ kHz, where p is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology µ=2 with 4 slots per subframe. The slot duration is 0.25 ms, the subcarrier spacing is 60 kHz, and the symbol duration is approximately 16.67 µs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

QCL Port and TCI States

In many cases, it is important for a UE to know which assumptions it can make on a channel corresponding to different transmissions. For example, the UE may need to know which reference signals it can use to estimate the channel in order to decode a transmitted signal (e.g., PDCCH or PDSCH). It may also be important for the UE to be able to report relevant channel state information (CSI) to the BS (e.g., a gNB) for scheduling, link adaptation, and/or beam management purposes. In NR, the concept of quasi co-location (QCL) and transmission configuration indicator (TCI) states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between the DL RSs in one CSI-RS set and the PDSCH DMRS ports.

In some cases, a UE may be configured with up to M TCI-States. Configuration of the M TCI-States can come about via higher layer signalling, while a UE may be signalled to decode PDSCH according to a detected PDCCH with DCI indicating one of the TCI states. Each configured TCI state may include one RS set TCI-RS-SetConfig that indicates different QCL assumptions between certain source and target signals.

For example, TCI-RS-SetConfig may indicate a source RS in the top block and may be associated with a target signal indicated in the bottom block. In this context, a target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS. Rather, a target RS may be any other RS (e.g., PUSCH DMRS, CSIRS, TRS, and SRS).

Each TCI-RS-SetConfig may contain various parameters. These parameters can, for example, configure quasi co-location relationship(s) between reference signals in the RS set and the DM-RS port group of the PDSCH. The RS set contains a reference to either one or two DL RSs and an associated quasi co-location type (QCL-Type) for each one configured by the higher layer parameter QCL-Type.

For the case of two DL RSs, the QCL types can take on a variety of arrangements. For example, QCL types may not be the same, regardless of whether the references are to the same DL RS or different DL RSs. In the illustrated example, SSB is associated with Type C QCL for P-TRS, while CSI-RS for beam management (CSIRS-BM) is associated with Type D QCL.

QCL information and/or types may in some scenarios depend on or be a function of other information. For example, the quasi co-location (QCL) types indicated to the UE can be based on higher layer parameter QCL-Type and may take one or a combination of the following types:

QCL-TypeA: {Doppler shift, Doppler spread, average delay, delay spread},

QCL-TypeB: {Doppler shift, Doppler spread},

QCL-TypeC: {average delay, Doppler shift}, and

QCL-TypeD: {Spatial Rx parameter},

Spatial QCL assumptions (QCL-TypeD) may be used to help a UE to select an analog Rx beam (e.g., during beam management procedures). For example, an SSB resource indicator may indicate a same beam for a previous reference signal should be used for a subsequent transmission.

An initial CORESET (e.g., CORESET ID 0 or simply CORESET #0) in NR may be identified during initial access by a UE (e.g., via a field in the MIB). A ControlResourceSet information element (CORESET IE) sent via radio resource control (RRC) signaling may convey information regarding a CORESET configured for a UE. The CORESET IE generally includes a CORESET ID, an indication of frequency domain resources (e.g., a number of RBs) assigned to the CORESET, contiguous time duration of the CORESET in a number of symbols, and Transmission Configuration Indicator (TCI) states.

As noted above, a subset of the TCI states provide QCL relationships between DL RS(s) in one RS set (e.g., TCI-Set) and PDCCH demodulation RS (DMRS) ports. A particular TCI state for a given UE (e.g., for unicast PDCCH) may be conveyed to the UE by the Medium Access Control (MAC) Control Element (MAC-CE). The particular TCI state is generally selected from the set of TCI states conveyed by the CORESET IE, with the initial CORESET (CORESET #0) generally configured via MIB.

Search space information may also be provided via RRC signaling. For example, the SearchSpace IE is another RRC IE that defines how and where to search for PDCCH candidates for a given CORESET. Each search space is associated with one CORESET. The SearchSpace IE identifies a search space configured for a CORESET by a search space ID. In an aspect, the search space ID associated with CORESET #0 is SearchSpace ID #0. The search space is generally configured via PBCH (MIB).

Overview of Codebook and Non-Codebook Based UL Transmissions

Some deployments support codebook-based transmission and non-codebook-based transmission schemes for uplink transmissions with wideband precoders. Codebook-based UL transmission is based on BS configuration and can be used in cases where reciprocity may not hold.

Figure 5:
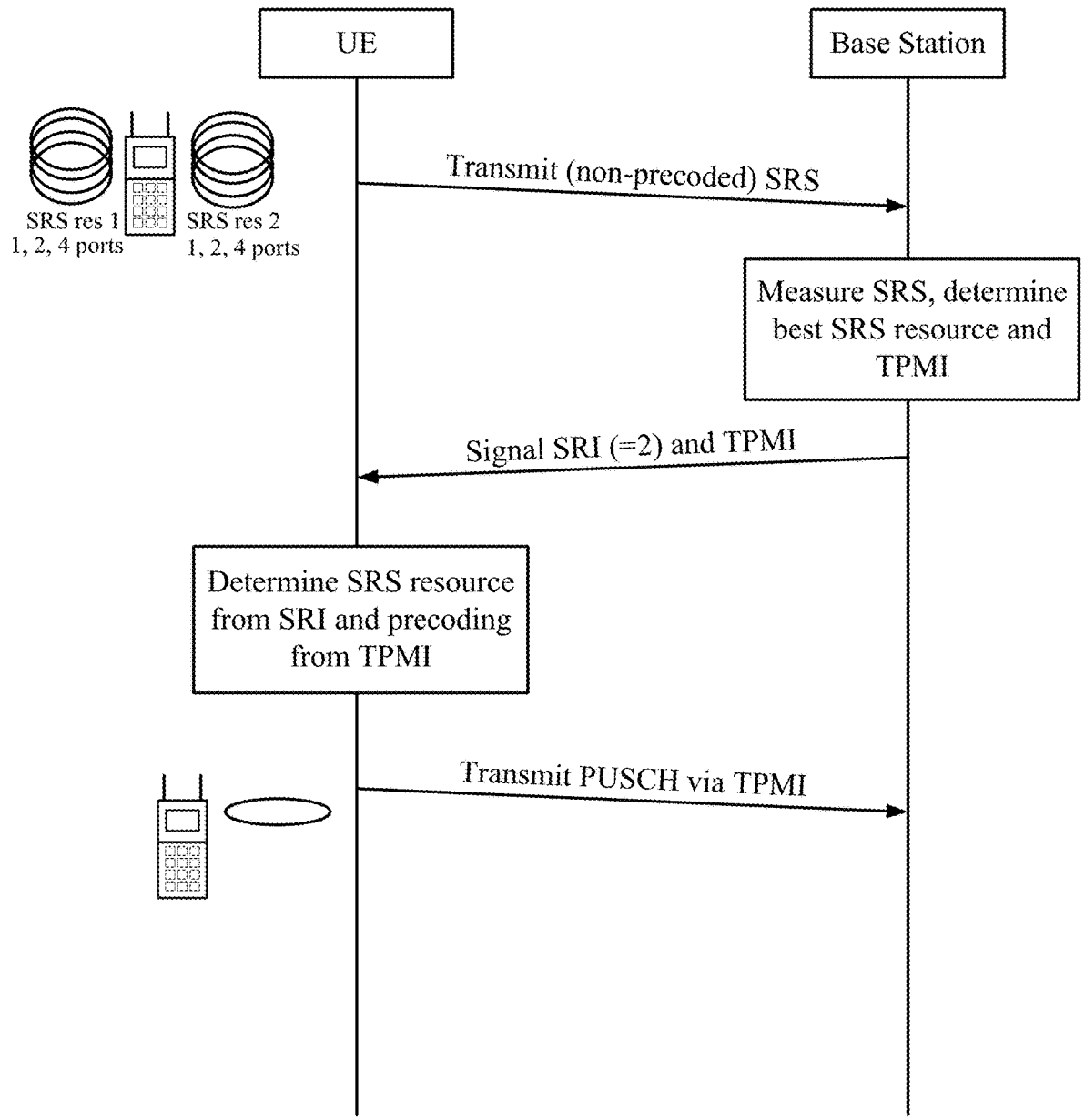
FIG. 5 is a call flow diagram illustrating an example of codebook based uplink (UL) transmission.

FIG. 5 is a call flow diagram 500 illustrating an example of conventional codebook based UL transmission using a wideband precoder. As illustrated, a UE transmits (non-precoded) SRS with up to 2 SRS resources (with each resource having 1, 2 or 4 ports). The gNB measures the SRS and, based on the measurement, selects one SRS resource and a wideband precoder to be applied to the SRS ports within the selected resource.

As illustrated, the gNB configures the UE with the selected SRS resource via an SRS resource indictor (SRI) and with the wideband precoder via a transmit precoder matrix indicator (TPMI). For a dynamic grant, the SRI and TPMI may be configured via DCI format 0_1. For a configured grant (e.g., for semi-persistent uplink), SRI and TPMI may be configured via RRC or DCI.

The UE determines the selected SRS resource from the SRI and precoding from TPMI and transmits PUSCH accordingly.

Figure 6:
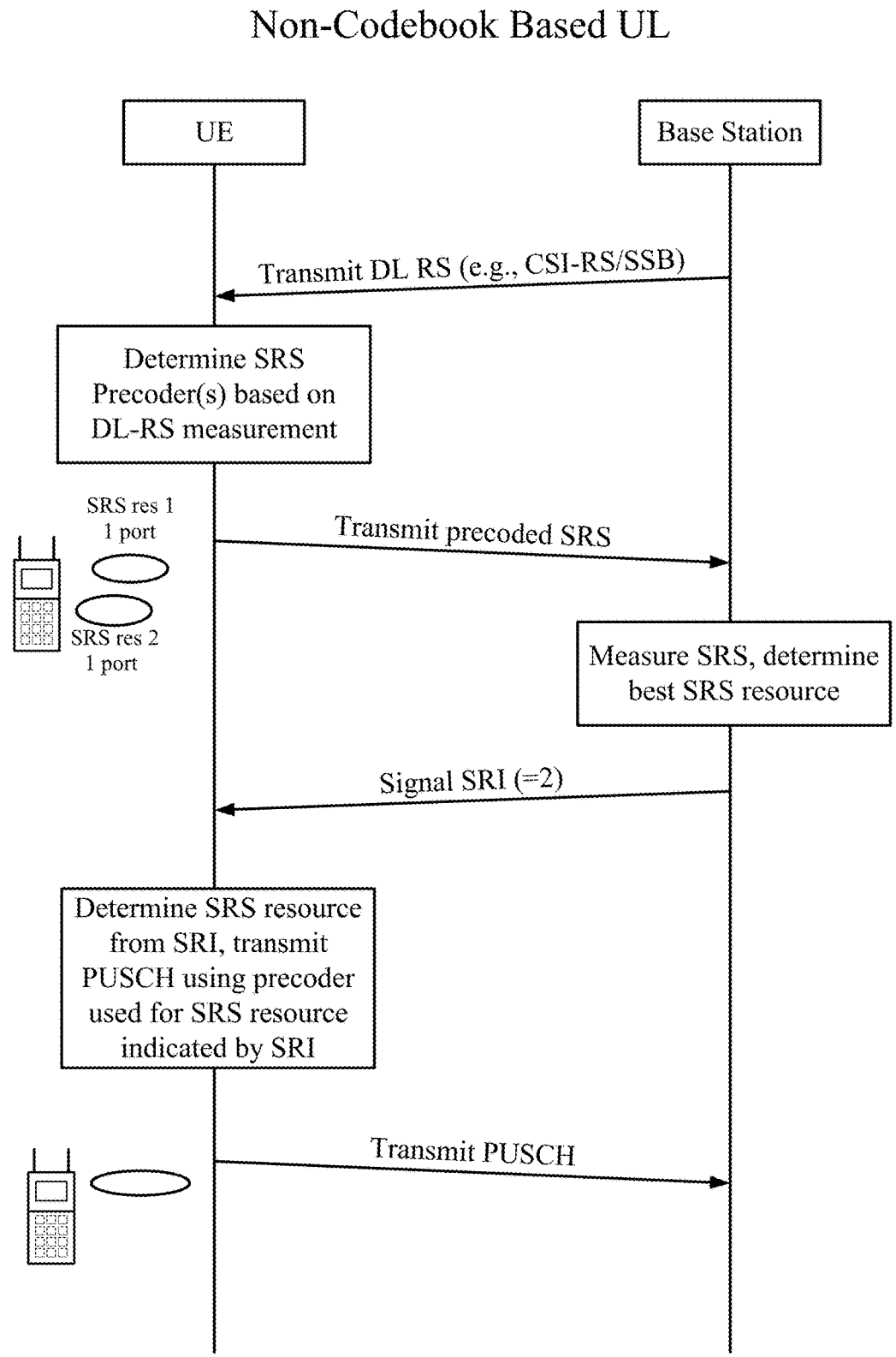
FIG. 6 is a call flow diagram illustrating an example of non-codebook based UL transmission.

FIG. 6 is a call flow diagram 600 illustrating an example of non-codebook based UL transmission. As illustrated, a UE transmits (precoded) SRS. While the example shows 2 SRS resources, the UE may transmit with up to 4 SRS resources (with each resource having 1 port). The gNB measures the SRS and, based on the measurement, selects one or more SRS resources. In this case, since the UE sent the SRS precoded, by selecting the SRS resources, the gNB is effectively also selecting precoding. For non-codebook based UL transmission, each SRS resource corresponds to a layer. The precoder of the layer is actually the precoder of the SRS which is emulated by the UE. Selecting N SRS resources means the rank is N. The UE is to transmit PUSCH using the same precoder as the SRS.

As illustrated, the gNB configures the UE with the selected SRS resource via an SRS resource indictor (SRI). For a dynamic grant, the SRI may be configured via DCI format 0_1. For a configured grant, the SRI may be configured via RRC or DCI.

Aspects Related to Dynamically Switching Between Asymmetric Panels for Codebook-Based Physical Uplink Shared Channel Transmissions Aspects of the present disclosure provide apparatuses, methods, processing Aspects of the present disclosure relate to wireless communications, and more particularly, to techniques for efficiently switching between antenna panels for uplink transmissions.

Figure 7:
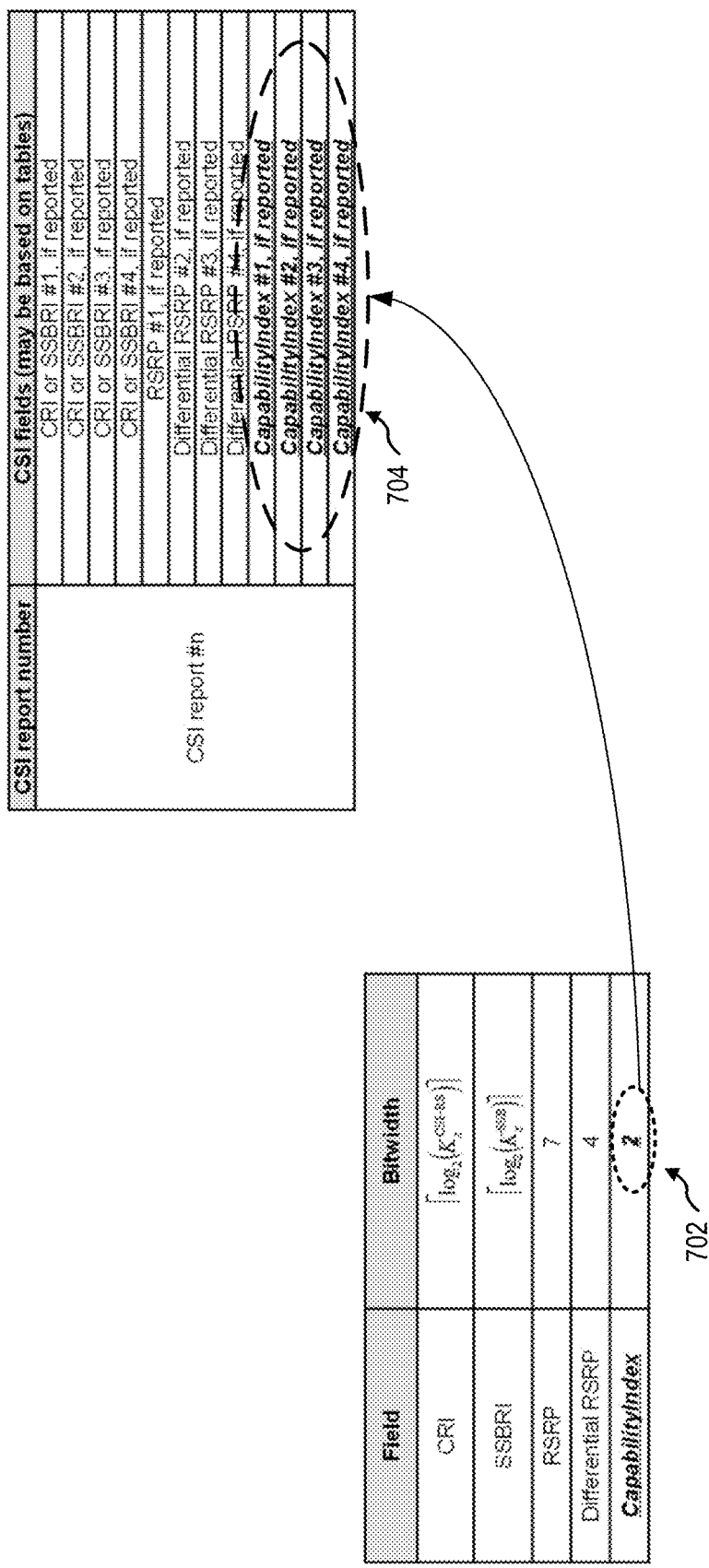
FIG. 7 depicts an example capability index reporting structure.

As noted above, a UE may indicate a maximum number of SRS ports it supports for a beam indicated in a beam report. For example, as illustrated in FIG. 7, this indication may be provided via a reported capability index 702. Capability index 702 may be a 2-bit value provided as uplink control information (UCI), and may indicate one of four capability index values 704, each of which may be associated with a maximum number of SRS ports (e.g., 1, 2, or 4). A gNB may schedule SRS for codebook-based PUSCH with a corresponding port number if UL sounding is needed, and will schedule PUSCH with a maximum layer number, limited by the port number.

Figure 8:
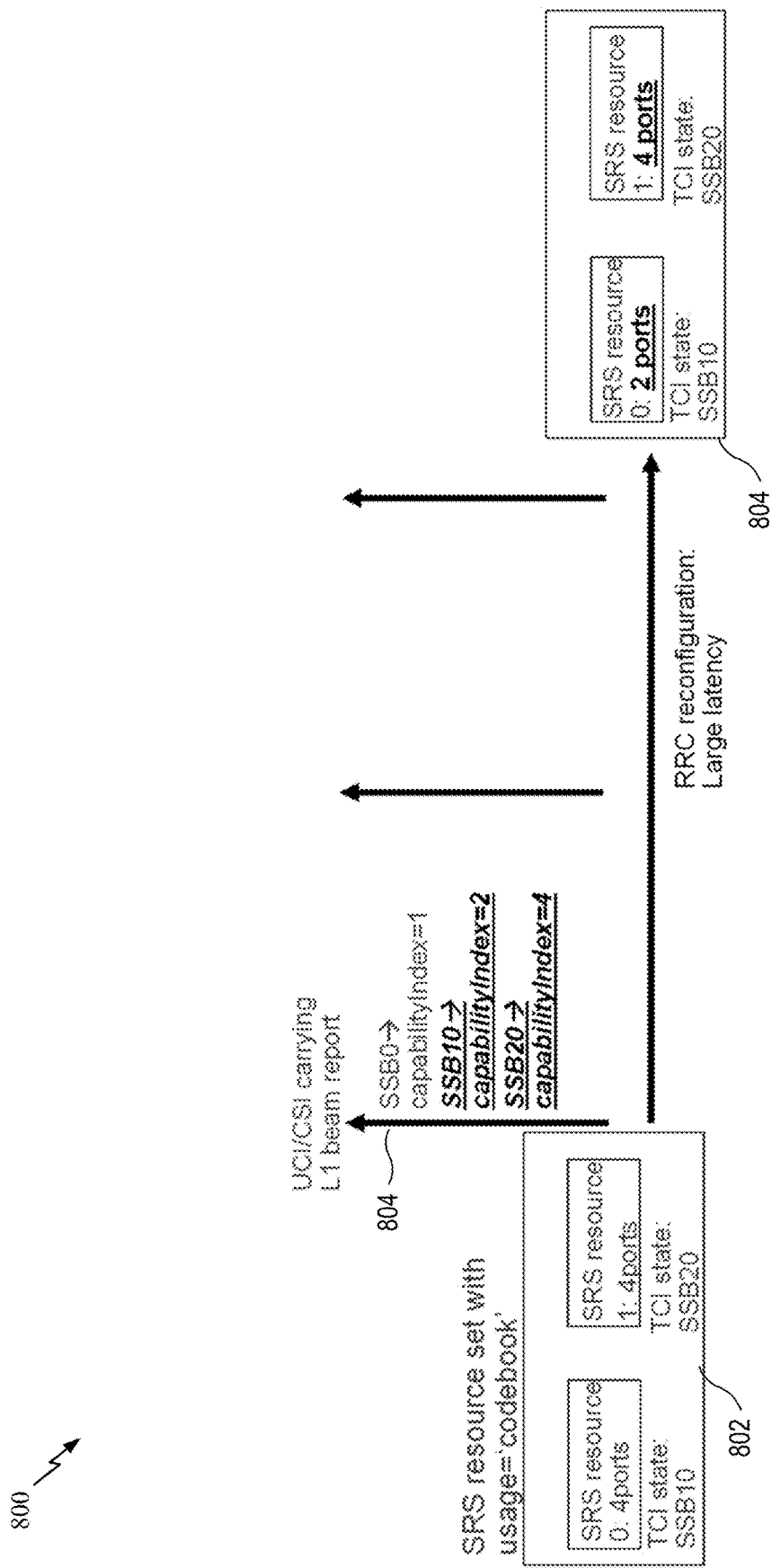
FIG. 8 depicts an example timeline for capability index reporting.

As illustrated in example timeline 800 of FIG. 8, an update to SRS ports in this manner is typically only possible with RRC-reconfiguration. As illustrated at 802, the UE may initially be configured with two SRS resources (SRS resource 0 and SRS resource 1). In the illustrated example, SRS resource 0 has 4 SRS ports and a transmission configuration information (TCI) state associated with downlink reference signal SSB10, while SRS resource 1 also has 4 SRS ports and a TCI state associated with downlink reference signal SSB20.

As illustrated, at 804, the UE may send a beam report and indicate different numbers of SRS ports, via a different capability index, for different beams in the report (associated with different SSBs). Unfortunately, a UE cannot dynamically send SRS from a panel with a larger/smaller capability index. As a result, the gNB cannot dynamically indicate a reduced/increased number of SRS ports for PUSCH scheduling. In some cases, unless a full power Mode 2 operation is configured, all SRS resources may be expected to have a same number of ports.

As illustrated at 804, updates to the SRS ports (with SRS resource 0 changing from 4 to 2) may not be applied until after RRC reconfiguration. Unfortunately, due to delays of RRC-reconfiguration, by this time, the number of SRS ports of the best antenna panel for Rx/Tx of the beam may have changed. Even if a configuration was allowed sooner, a dynamic change of number of SRS ports of a SRS resources with TCI state equal to the reported L1 beam may be needed.

Aspects of the present disclosure, however, provide a signaling mechanism where a UE may dynamically indicate a reduced/increased number of SRS ports for PUSCH scheduling. This mechanism may allow a UE to dynamically switch between asymmetric antenna panels (e.g., antenna panels that have different numbers of antennas/ports).

Figure 9:
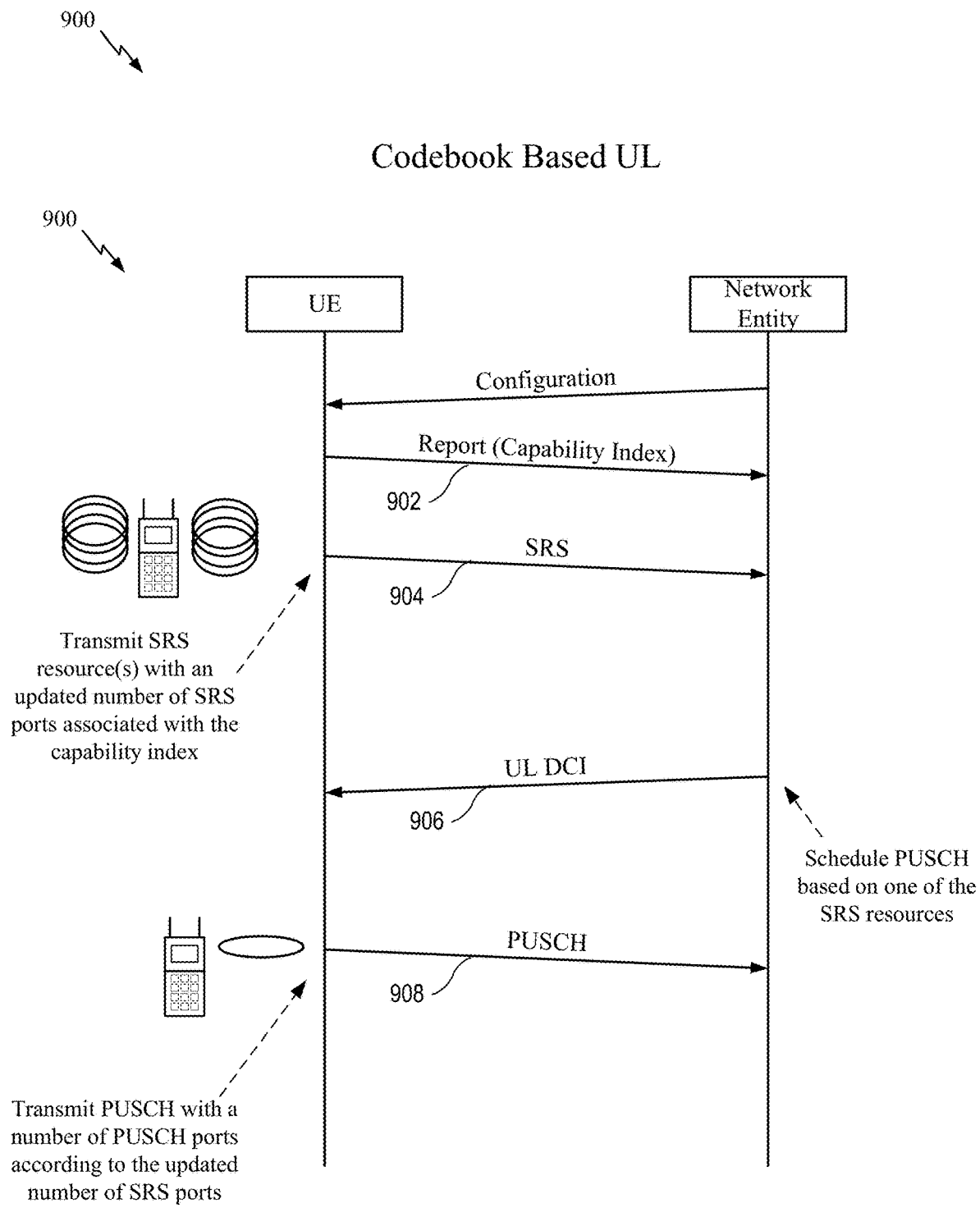
FIG. 9 is a call flow diagram illustrating an example of codebook based uplink (UL) transmission, in accordance with certain aspects of the present disclosure.

The signaling mechanism proposed herein may be understood with reference to the call flow diagram 900 of FIG. 9. The UE and network entity depicted in FIG. 9 may be examples of UE 104 and BS 102 depicted and described with respect to FIGS. 1 and 3. The network entity may be an example of a node of a disaggregated base station depicted and described with respect to FIG. 2.

The example shown in FIG. 9 may assume that the UE is configured with one or more SRS resources for codebook-based PUSCH.

At 902, the UE reports a capability index. As described above, the capability index value may correspond to a maximum number of SRS ports and may be associated with a downlink reference signal (DL-RS), such as an SSB index or CSI-RS resource. This report may indicate the maximum number of UL (e.g., SRS/PUSCH) ports of the panel that is used to receive the DL-RS. As illustrated at 1002 of FIG. 10, the report may be carried on UCI as part of a layer 1 (L1) beam report (on PUCCH or PUSCH). The report may include a capability index for multiple DL-RSs (e.g., SSB10 and SSB20).

If a TCI state (or other spatial relation information) of the one or more configured SRS resources is associated with the DL-RS for which capability index is reported in the UCI, the number of ports of the SRS resources are updated to the reported capability index number.

Referring back to FIG. 9, at 904, the UE transmits the one or more SRS resources based on the updated number of SRS ports. At 906, the network entity (e.g., gNB) schedules a PUSCH based on one of the SRS resources (e.g., an UL DCI/grant indicates one of the SRS resources in case multiple are configured). At 908, the UE transmits the PUSCH with a number of PUSCH ports equal to the updated number of SRS ports.

Figure 10:
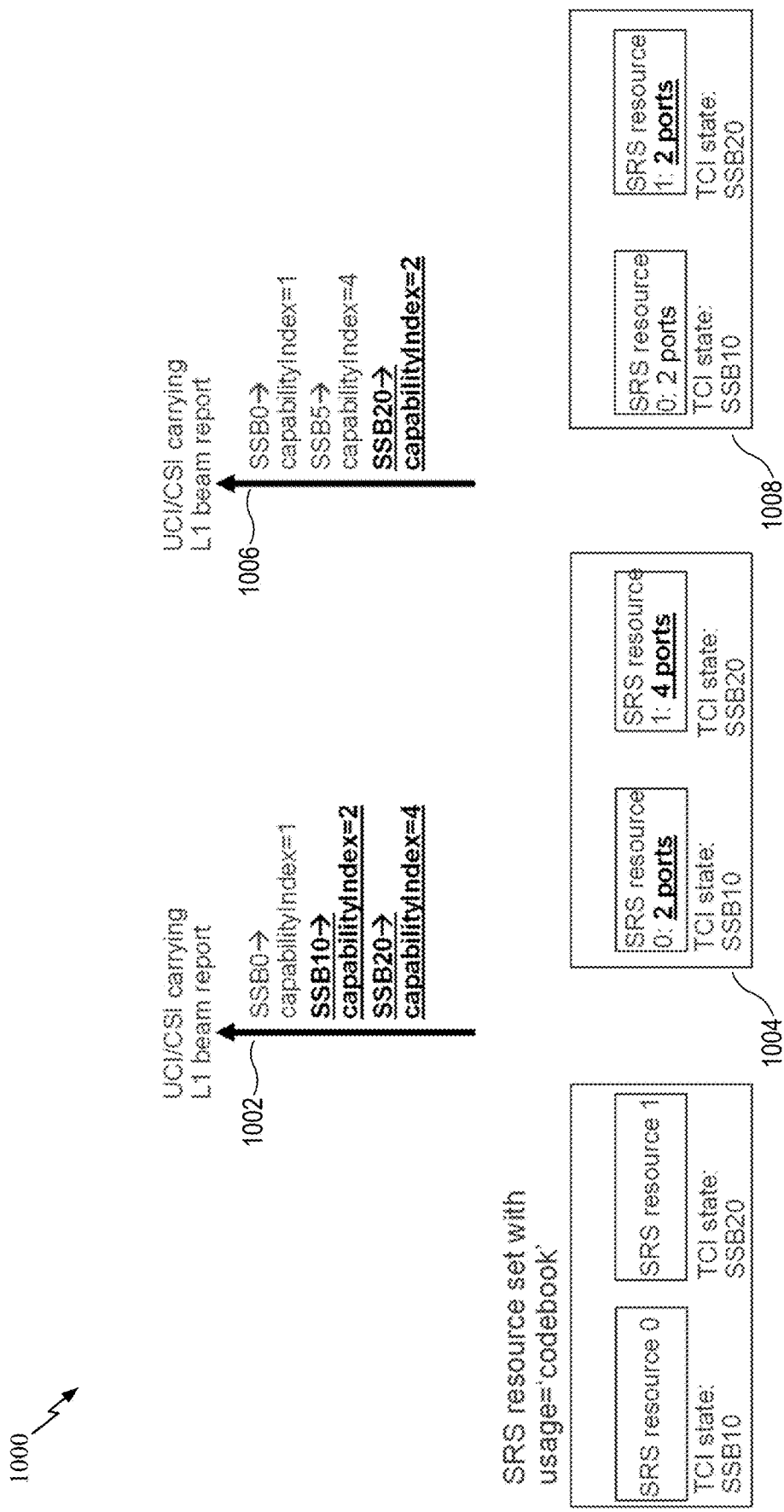
FIG. 10 depicts an example timeline for capability index reporting and uplink transmission, in accordance with certain aspects of the present disclosure.

As illustrated at 1002 and 1006 in FIG. 10, using the signaling mechanism proposed herein, a UE may dynamically indicate a reduced/increased number of SRS ports for PUSCH scheduling. As illustrated at 1004 and 1008, the number of SRS ports may be updated dynamically, without having to endure the delay of RRC reconfiguration. At 1004, the number of SRS ports for SRS resource 0 is updated to 2, while the number of SRS ports for SRS resource 1 is updated to 4, based on the capability index values reported at 1002. At 1008, the number of SRS ports for SRS resource 1 is updated to 2, based on the capability index values reported at 1006.

Aspects of the present disclosure provide various approaches for how to apply the updated number of SRS ports.

For example, according to a first approach, SRS parameters, such as a cyclic shift and comb offset per port may be determined based on the updated number of SRS ports. According to this approach, if an RRC configuration includes a number of SRS ports, the updated number of SRS ports may overwrite the RRC parameter and, thus, all the SRS parameters may be determined based on the updated number of ports.

As an example, an SRS resource may be configured with an initial cyclic shift of 0 and comb spacing of 4 (which has 12 cyclic shifts). If the updated number of ports is 4, a cyclic shift of SRS ports may be {0,3,6,9}, and ports 1000 and 1002 may be in a first comb offset, while ports 1001 and 1003 may be in a second comb offset. If the updated number of ports is 2, a cyclic shift of SRS ports may be {0,6} and both ports may be in a same comb offset.

According to a second approach, an RRC-configured number of SRS ports may be the maximum number of ports from which SRS parameters, such as cyclic shift and/or comb offset per port are determined. When the updated number of SRS ports is smaller than this max number, some SRS ports may be dropped. Thus, according to this approach, SRS parameters, such as cyclic shift and/or comb offset per port, may not be impacted by the updated number of SRS ports, but some SRS ports may not be transmitted.

As an example, an SRS resource may be configured with a maximum of 4 ports, with an initial cyclic shift of 0 and comb spacing of 4 (which has 12 cyclic shifts), such that the cyclic shift of SRS ports are {0,3,6,9}, and ports 1000 and 1002 are in a first comb offset, while ports 1001 and 1003 are in another comb offset. If the updated number of ports is 4, all ports 1000, 1001, 1002, and 1003 with the parameters noted above may be transmitted. On the other hand, if the updated number of ports is 2, then only two ports (e.g., 1000 and 1001, or 1000 and 1002) are transmitted, but the cyclic shift and/or comb offset for the transmitted ports are not changed.

Aspects of the present disclosure also provide various options for when to update the number of SRS ports.

For example, according to a first option, a UE may update the number of SRS ports autonomously. For example, the UE may update the number of SRS ports a fixed time (e.g., in terms of a number of symbols/slots) after transmission of the UCI carrying the capability index associated with the DL-RS. While this option has some risk of mismatch between the UE and gNB, in that there is no confirmation that the gNB received the capability index updating the number of SRS ports, it may also allow the UE to apply the updated number of SRS ports faster than other options.

According to a second option, the number of SRS ports may be updated some time after the gNB acknowledges reception of the UCI carrying the capability index associated with the DL-RS. For example, the UE may update the number of SRS ports a fixed time (number of symbols/slots) after receiving the acknowledgment (e.g., carried in a DCI/MAC-CE) corresponding to the transmitted UCI. This second option may help avoid mismatch between UE and gNB, in case the UCI is not decoded by the gNB, albeit with a slight latency penalty when compared to the first option.

According to a third option, the number of SRS ports may be updated after the UE receives an explicit indication from the gNB. For example, the gNB may indicate the updated number of SRS ports explicitly in a DCI/MAC-CE. According to this option, it may be up to the gNB whether and when to update the number of SRS ports after receiving the capability index in the UCI.

Aspects of the present disclosure also provide various options for TCI state (spatial relation information) of the one or more SRS resources associated with the DL-RS.

According to a first option, only direct association may be considered. In other words, TCI state (spatial relation information) may be applied only if such information is configured with that DL-RS According to a second option, both direct and indirect association may be considered. According to this option, in addition to the direct association of the first option, the TCI state/spatial relation information may be applied if configured with a RS (SSB/CSI-RS/another SRS) that is quasi co-located (QCLed), directly or indirectly, with the DL-RS. As a first example, a UE may apply a TCI state if the SRS resource is configured with a CSI-RS resource that is QCLed with the DL-RS. As a second example, the UE may apply a TCI state if the SRS resource is configured with another SRS resource with a TCI state that is configured with a CSI-RS resource that is QCLed with the DL-RS.

The techniques proposed herein may also be applied to simultaneous transmission across multiple panels (STxMP). For single-DCI based spatial division multiplexing (SDM), a single DCI schedules a PUSCH with two sets of demodulation reference signal (DMRS) ports/layers transmitted from two panels with different Tx beams, precoders, and power control parameters. In such cases, two sets of layers may be associated with 2 SRS resource sets and rank combinations may include the following combinations: 1+1, 1+2, 2+1, 2+2 layers.

Figure 11:
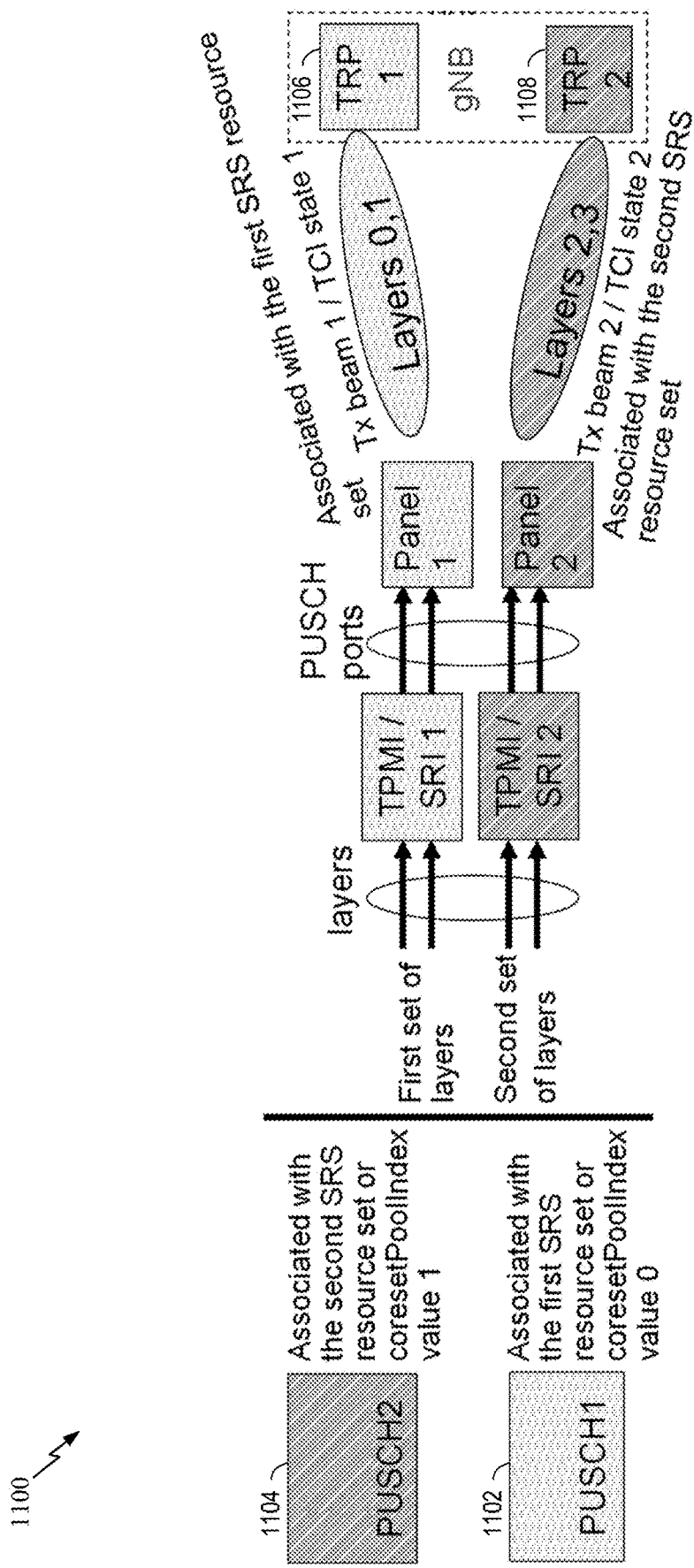
FIG. 11 illustrates an example of simultaneous codebook based UL transmissions.

As illustrated in FIG. 11, in some cases, overlapping PUSCHs (1102 and 1104) may be scheduled with multi-DCI based multiple transmission reception point (mTRP) scenarios for transmission TRP1 1106 and TRP2 1108. In such cases, two different PUSCHs in the same serving cell (component carrier) are partially/fully overlapping, in at least the time domain. In the frequency domain, the two different PUSCHs may or may not overlap.

As illustrated in FIG. 11, the two PUSCHs are associated with different control resource set (CORESET) Pool Index values. This may be different than single-DCI based framework, where simultaneous Tx is within one PUSCH.

The first PUSCH 1102 (associated with coresetPoolIndex value 0) may be associated with the first SRS resource set (and may be transmitted using a first beam, TCI state, power control parameters, and/or precoder). The second PUSCH 1104 (associated with coresetPoolIndex value 1) may be associated with the second SRS resource set (and may be transmitted using a second beam, TCI state, power control parameters, and/or precoder).

Aspects of the present disclosure also provide mechanisms for signaling an updated number of SRS ports for simultaneous PUSCH transmissions, such as when a UE is configured with two SRS resource sets, each containing one or more SRS resources for codebook-based PUSCH.

Figure 12:
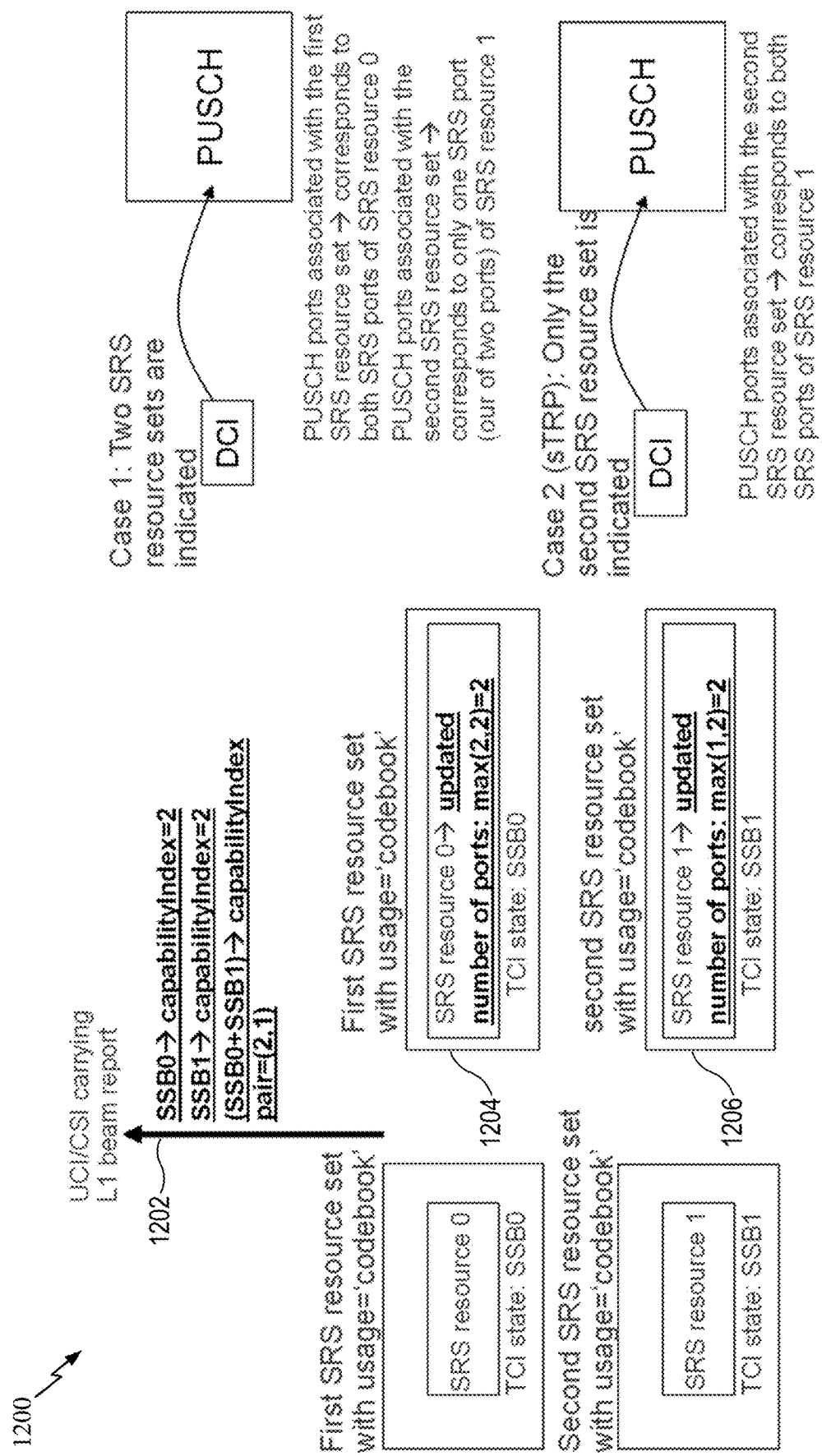
FIG. 12 depicts an example timeline for capability index reporting and simultaneous uplink transmissions, in accordance with certain aspects of the present disclosure.

As illustrated at 1202 in FIG. 12, in such cases, the UE may report a pair of capability indices (e.g., corresponding to a maximum number of SRS ports) associated with a pair of DL-RS's (e.g., a pair of SSB indices or pair of CSI-RS resources). In some cases, the pair of capability indices may be reported in addition to a capability index report for each individual DL-RS. In the example illustrated in FIG. 12, the UE reports capability index (2+1) for a pair of SSBs (e.g., SSB0, SSB1) when the beams corresponding to the two SSBs are transmitted simultaneously, but also reports capability index 2 for SSB0 individually and capability index 2 for SSB1 individually.

For a given DL-RS, it may be assumed that a first value $P_{simultaneous}$ is the capability index in a given pair, while a second value $P_{individual}$ is the capability index for that DL-RS individually. In other words, in the example above: $P_{simultaneous}=2$ and $P_{individual}=2$ for SSB0, and $P_{simultaneous}=1$ and $P_{individual}=2$ for SSB1.

If TCI state/spatial relation information of the one or more SRS resources is associated with the DL-RS for which capability index is reported in the UCI, the number of ports of the SRS resources may be updated as follows. If the SRS resource can be used for both sTRP PUSCH and STxMP transmissions, then the number of SRS ports may be updated to $\max(P_{simultaneous}, P_{individual})$, which may typically be $P_{individual}$. Otherwise, if the SRS resource is specifically configured for sTRP PUSCH or specifically configured for STxMP, the number of SRS ports may be updated to the corresponding capability index value.

In the example illustrated in FIG. 12, as shown at 1204, the number of SRS ports for SRS resource 0 is 2, because max(2,2)=2. Similarly, as shown at 1206, the number of SRS ports for SRS resource 1 is 2, because max(1,2)=2.

The UE may then transmit the SRS resources (at least two in this case), including one in the first SRS resource set and another in the second SRS resource set, based on the updated number of SRS ports.

The gNB may then schedule PUSCH, which may be one of two cases. A first case corresponds to STxMP (either a PUSCH with two TCI states, or two overlapping PUSCHs associated with different TCI states). In this case, labeled Case 1 in FIG. 12, a first SRS resource from the first SRS resource set and a second SRS resource from the second SRS resource set are indicated. A second case, labeled Case 2 in FIG. 12, corresponds to sTRP. In this case, one SRS resource (either from the first set or from the second set) is indicated.

The UE may then transmit the PUSCH as follows, depending on the case. In the first case, if the updated number of SRS ports for either the first or the second SRS resource is equal to $P_{simultaneous}$, then PUSCH ports corresponds to transmitted SRS ports. In the first case, if the updated number of SRS ports for either the first or the second SRS resource is larger than $P_{simultaneous}$ (e.g., because $P_{simultaneous}<P_{individual}$ as described above), then PUSCH ports corresponds to a subset of transmitted SRS ports.

In the second case, PUSCH ports corresponds to transmitted SRS ports, given that the updated number of SRS ports is always equal to $P_{individual}$ assuming that $$\max(P_{simultaneous}, P_{individual}) = P_{individual}.$$

Example Operations

Figure 13:
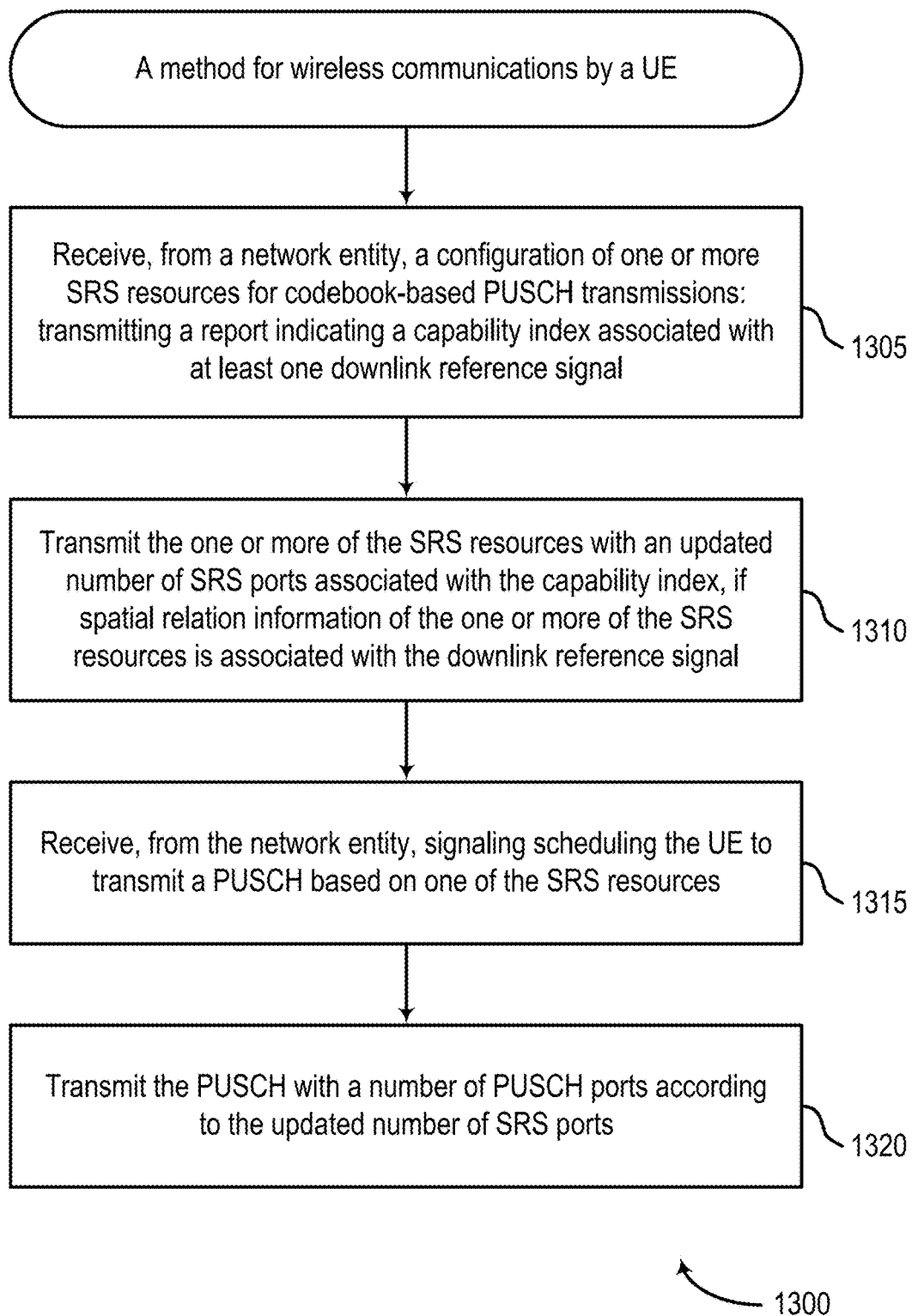
FIG. 13 depicts a method for wireless communications.

FIG. 13 shows an example of a method 1300 of wireless communication by a UE, such as a UE 104 of FIGS. 1 and 3.

Method 1300 begins at step 1305 with receiving, from a network entity, a configuration of one or more SRS resources for codebook-based PUSCH transmissions; transmitting a report indicating a capability index associated with at least one downlink reference signal. In some cases, the operations of this step refer to, or may be performed by, circuitry for receiving and/or code for receiving as described with reference to FIG. 15.

Method 1300 then proceeds to step 1310 with transmitting the one or more of the SRS resources with an updated number of SRS ports associated with the capability index, if spatial relation information of the one or more of the SRS resources is associated with the downlink reference signal. In some cases, the operations of this step refer to, or may be performed by, circuitry for transmitting and/or code for transmitting as described with reference to FIG. 15.

Method 1300 then proceeds to step 1315 with receiving, from the network entity, signaling scheduling the UE to transmit a PUSCH based on one of the SRS resources. In some cases, the operations of this step refer to, or may be performed by, circuitry for receiving and/or code for receiving as described with reference to FIG. 15.

Method 1300 then proceeds to step 1320 with transmitting the PUSCH with a number of PUSCH ports according to the updated number of SRS ports. In some cases, the operations of this step refer to, or may be performed by, circuitry for transmitting and/or code for transmitting as described with reference to FIG. 15.

In some aspects, the capability index indicates a maximum number of uplink ports of a panel used to receive the at least one downlink reference signal.

In some aspects, the downlink reference signal comprises at least one of a SSB or a CSI-RS.

In some aspects, transmitting the one or more of the SRS resources comprises transmitting the one or more SRS resources with one or more SRS parameters determined based on the updated number of SRS ports.

In some aspects, the updated number of SRS ports is less than a maximum number of SRS ports previously configured for the UE; and transmitting the one or more of the SRS resources comprises transmitting fewer than the maximum number of SRS ports with previously used SRS parameters.

In some aspects, the method 1300 further includes updating the number of SRS ports after a determined time after transmitting the report indicating the capability index. In some cases, the operations of this step refer to, or may be performed by, circuitry for updating and/or code for updating as described with reference to FIG. 15.

In some aspects, the method 1300 further includes receiving, from the network entity, an acknowledgment corresponding to the transmitted report. In some cases, the operations of this step refer to, or may be performed by, circuitry for receiving and/or code for receiving as described with reference to FIG. 15.

In some aspects, the method 1300 further includes updating the number of SRS ports after a determined after receiving the acknowledgment. In some cases, the operations of this step refer to, or may be performed by, circuitry for updating and/or code for updating as described with reference to FIG. 15.

In some aspects, the method 1300 further includes receiving, from the network entity, an indication of the updated number of SRS ports. In some cases, the operations of this step refer to, or may be performed by, circuitry for receiving and/or code for receiving as described with reference to FIG. 15.

In some aspects, the one or more of the SRS resources are transmitted using at least one of: spatial relation information configured with the downlink reference signal; or spatial relation information configured with a reference signal that is quasi co-located with the downlink reference signal.

In some aspects, the configuration configures the UE with at least two SRS resource sets, each including one or more SRS resources; the report indicates a capability index associated with at least two downlink reference signals; and transmitting the one or more of the SRS resources comprises transmitting at least one SRS resource, from each of the at least two SRS resource sets.

In some aspects, the method 1300 further includes updating the number of SRS ports, for a given SRS resource, based on: a maximum of a number of SRS ports that can be used for an individual SRS transmission or a maximum number of SRS ports that can be used for simultaneous SRS transmissions, if that SRS resource can be used for both single transmission and simultaneous transmissions; or a number of SRS ports corresponding to a capability index value included in the report. In some cases, the operations of this step refer to, or may be performed by, circuitry for updating and/or code for updating as described with reference to FIG. 15.

In some aspects, the PUSCH comprises a simultaneous PUSCH transmission; and the number of PUSCH ports is equal to the updated number of SRS ports, if the updated number of SRS ports is the maximum number of SRS ports that can be used for simultaneous SRS transmissions or the number of PUSCH ports corresponds to a subset of transmitted SRS ports.

In some aspects, the PUSCH comprises a single PUSCH transmission; and the number of PUSCH ports corresponds to the updated number of SRS ports.

Figure 15:
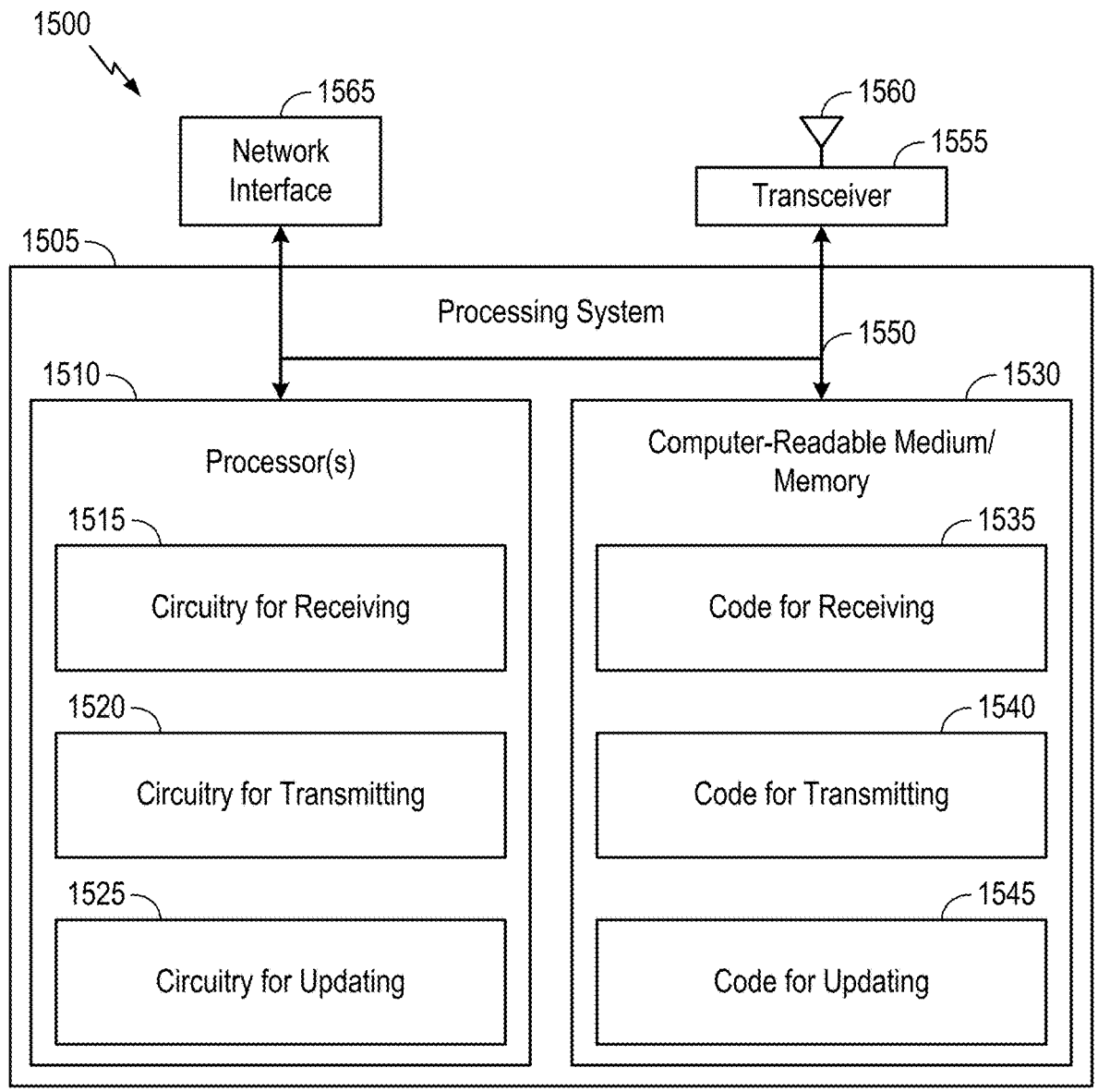
FIG. 15 depicts aspects of an example communications device.

In one aspect, method 1300, or any aspect related to it, may be performed by an apparatus, such as communications device 1500 of FIG. 15, which includes various components operable, configured, or adapted to perform the method 1300. Communications device 1500 is described below in further detail.

Note that FIG. 13 is just one example of a method, and other methods including fewer, additional, or alternative steps are possible consistent with this disclosure.

Figure 14:
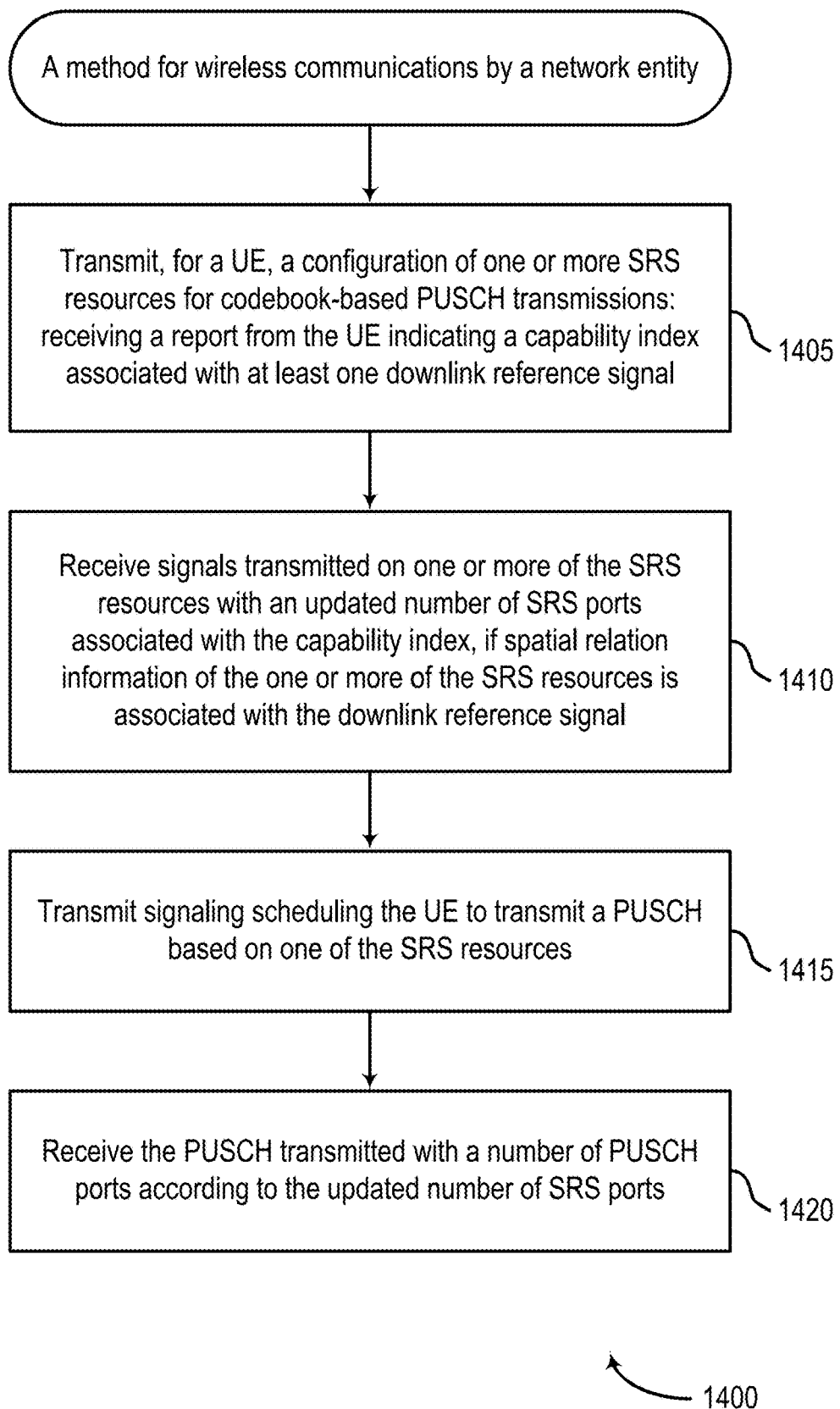
FIG. 14 depicts a method for wireless communications.

FIG. 14 shows an example of a method 1400 of wireless communication by a network entity, such as a BS 102 of FIGS. 1 and 3, or a disaggregated base station as discussed with respect to FIG. 2.

Method 1400 begins at step 1405 with transmitting, for a UE, a configuration of one or more SRS resources for codebook-based PUSCH transmissions: receiving a report from the UE indicating a capability index associated with at least one downlink reference signal. In some cases, the operations of this step refer to, or may be performed by, circuitry for transmitting and/or code for transmitting as described with reference to FIG. 15.

Method 1400 then proceeds to step 1410 with receiving signals transmitted on one or more of the SRS resources with an updated number of SRS ports associated with the capability index, if spatial relation information of the one or more of the SRS resources is associated with the downlink reference signal. In some cases, the operations of this step refer to, or may be performed by, circuitry for receiving and/or code for receiving as described with reference to FIG. 15.

Method 1400 then proceeds to step 1415 with transmitting signaling scheduling the UE to transmit a PUSCH based on one of the SRS resources. In some cases, the operations of this step refer to, or may be performed by, circuitry for transmitting and/or code for transmitting as described with reference to FIG. 15.

Method 1400 then proceeds to step 1420 with receiving the PUSCH transmitted with a number of PUSCH ports according to the updated number of SRS ports. In some cases, the operations of this step refer to, or may be performed by, circuitry for receiving and/or code for receiving as described with reference to FIG. 15.

In some aspects, the capability index indicates a maximum number of uplink ports of a panel used to receive the at least one downlink reference signal.

In some aspects, the downlink reference signal comprises at least one of a SSB or a CSI-RS.

In some aspects, the one or more of the SRS resources are received with one or more SRS parameters determined based on the updated number of SRS ports.

In some aspects, the updated number of SRS ports is less than a maximum number of SRS ports previously configured for the UE; and the one or more of the SRS resources are transmitted with fewer than the maximum number of SRS ports with previously used SRS parameters.

In some aspects, the method 1400 further includes updating the number of SRS ports after a determined time after transmitting the report indicating the capability index. In some cases, the operations of this step refer to, or may be performed by, circuitry for updating and/or code for updating as described with reference to FIG. 15.

In some aspects, the method 1400 further includes transmitting an acknowledgment corresponding to the transmitted report. In some cases, the operations of this step refer to, or may be performed by, circuitry for transmitting and/or code for transmitting as described with reference to FIG. 15.

In some aspects, the method 1400 further includes updating the number of SRS ports after a determined after receiving the acknowledgment. In some cases, the operations of this step refer to, or may be performed by, circuitry for updating and/or code for updating as described with reference to FIG. 15.

In some aspects, the method 1400 further includes transmitting an indication of the updated number of SRS ports. In some cases, the operations of this step refer to, or may be performed by, circuitry for transmitting and/or code for transmitting as described with reference to FIG. 15.

In some aspects, the one or more of the SRS resources are transmitted using at least one of: spatial relation information configured with the downlink reference signal; or spatial relation information configured with a reference signal that is quasi co-located with the downlink reference signal.

In some aspects, the configuration configures the UE with at least two SRS resource sets, each including one or more SRS resources; the report indicates a capability index associated with at least two downlink reference signals; and the one or more of the SRS resources comprises at least one SRS resource, from each of the at least two SRS resource sets.

In some aspects, the method 1400 further includes updating the number of SRS ports, for a given SRS resource, based on: a maximum of a number of SRS ports that can be used for an individual SRS transmission or a maximum number of SRS ports that can be used for simultaneous SRS transmissions, if that SRS resource can be used for both single transmission and simultaneous transmissions; or a number of SRS ports corresponding to a capability index value included in the report. In some cases, the operations of this step refer to, or may be performed by, circuitry for updating and/or code for updating as described with reference to FIG. 15.

In some aspects, the PUSCH comprises a simultaneous PUSCH transmission; and the number of PUSCH ports is equal to the updated number of SRS ports, if the updated number of SRS ports is the maximum number of SRS ports that can be used for simultaneous SRS transmissions or the number of PUSCH ports corresponds to a subset of transmitted SRS ports.

In some aspects, the PUSCH comprises a single PUSCH transmission; and the number of PUSCH ports corresponds to the updated number of SRS ports.

In one aspect, method 1400, or any aspect related to it, may be performed by an apparatus, such as communications device 1500 of FIG. 15, which includes various components operable, configured, or adapted to perform the method 1400. Communications device 1500 is described below in further detail.

Note that FIG. 14 is just one example of a method, and other methods including fewer, additional, or alternative steps are possible consistent with this disclosure.

Example Communications Device

FIG. 15 depicts aspects of an example communications device 1500. In some aspects, communications device 1500 is a user equipment, such as UE 104 described above with respect to FIGS. 1 and 3. In some aspects, communications device 1500 is a network entity, such as BS 102 of FIGS. 1 and 3, or a disaggregated base station as discussed with respect to FIG. 2.

The communications device 1500 includes a processing system 1505 coupled to the transceiver 1555 (e.g., a transmitter and/or a receiver). In some aspects (e.g., when communications device 1500 is a network entity), processing system 1505 may be coupled to a network interface 1565 that is configured to obtain and send signals for the communications device 1500 via communication link(s), such as a backhaul link, midhaul link, and/or fronthaul link as described herein, such as with respect to FIG. 2. The transceiver 1555 is configured to transmit and receive signals for the communications device 1500 via the antenna 1560, such as the various signals as described herein. The processing system 1505 may be configured to perform processing functions for the communications device 1500, including processing signals received and/or to be transmitted by the communications device 1500.

The processing system 1505 includes one or more processors 1510. In various aspects, the one or more processors 1510 may be representative of one or more of receive processor 358, transmit processor 364, TX MIMO processor 366, and/or controller/processor 380, as described with respect to FIG. 3. In various aspects, one or more processors 1510 may be representative of one or more of receive processor 338, transmit processor 320, TX MIMO processor 330, and/or controller/processor 340, as described with respect to FIG. 3. The one or more processors 1510 are coupled to a computer-readable medium/memory 1530 via a bus 1550. In certain aspects, the computer-readable medium/memory 1530 is configured to store instructions (e.g., computer-executable code) that when executed by the one or more processors 1510, cause the one or more processors 1510 to perform the method 1300 described with respect to FIG. 13, or any aspect related to it; and the method 1400 described with respect to FIG. 14, or any aspect related to it. Note that reference to a processor performing a function of communications device 1500 may include one or more processors 1510 performing that function of communications device 1500.

In the depicted example, computer-readable medium/memory 1530 stores code (e.g., executable instructions), such as code for receiving 1535, code for transmitting 1540, and code for updating 1545. Processing of the code for receiving 1535, code for transmitting 1540, and code for updating 1545 may cause the communications device 1500 to perform the method 1300 described with respect to FIG. 13, or any aspect related to it; and the method 1400 described with respect to FIG. 14, or any aspect related to it.

The one or more processors 1510 include circuitry configured to implement (e.g., execute) the code stored in the computer-readable medium/memory 1530, including circuitry for receiving 1515, circuitry for transmitting 1520, and circuitry for updating 1525. Processing with circuitry for receiving 1515, circuitry for transmitting 1520, and circuitry for updating 1525 may cause the communications device 1500 to perform the method 1300 described with respect to FIG. 13, or any aspect related to it; and the method 1400 described with respect to FIG. 14, or any aspect related to it.

Various components of the communications device 1500 may provide means for performing the method 1300 described with respect to FIG. 13, or any aspect related to it; and the method 1400 described with respect to FIG. 14, or any aspect related to it. For example, means for transmitting, sending or outputting for transmission may include transceivers 354 and/or antenna(s) 352 of the UE 104 illustrated in FIG. 3, transceivers 332 and/or antenna(s) 334 of the BS 102 illustrated in FIG. 3, and/or the transceiver 1555 and the antenna 1560 of the communications device 1500 in FIG. 15. Means for receiving or obtaining may include transceivers 354 and/or antenna(s) 352 of the UE 104 illustrated in FIG. 3, transceivers 332 and/or antenna(s) 334 of the BS 102 illustrated in FIG. 3, and/or the transceiver 1555 and the antenna 1560 of the communications device 1500 in FIG. 15.

Example Clauses

Implementation examples are described in the following numbered clauses:

Clause 1: A method for wireless communications by a UE, comprising: receiving, from a network entity, a configuration of one or more SRS resources for codebook-based PUSCH transmissions: transmitting a report indicating a capability index associated with at least one downlink reference signal; transmitting the one or more of the SRS resources with an updated number of SRS ports associated with the capability index, if spatial relation information of the one or more of the SRS resources is associated with the downlink reference signal; receiving, from the network entity, signaling scheduling the UE to transmit a PUSCH based on one of the SRS resources; and transmitting the PUSCH with a number of PUSCH ports according to the updated number of SRS ports.

Clause 2: The method of Clause 1, wherein the capability index indicates a maximum number of uplink ports of a panel used to receive the at least one downlink reference signal.

Clause 3: The method of any one of Clauses 1-2, wherein the downlink reference signal comprises at least one of a SSB or a CSI-RS.

Clause 4: The method of any one of Clauses 1-3, wherein transmitting the one or more of the SRS resources comprises transmitting the one or more SRS resources with one or more SRS parameters determined based on the updated number of SRS ports.

Clause 5: The method of any one of Clauses 1-4, wherein: the updated number of SRS ports is less than a maximum number of SRS ports previously configured for the UE; and transmitting the one or more of the SRS resources comprises transmitting fewer than the maximum number of SRS ports with previously used SRS parameters.

Clause 6: The method of any one of Clauses 1-5, further comprising: updating the number of SRS ports after a determined time after transmitting the report indicating the capability index.

Clause 7: The method of any one of Clauses 1-6, further comprising: receiving, from the network entity, an acknowledgment corresponding to the transmitted report; and updating the number of SRS ports after a determined after receiving the acknowledgment.

Clause 8: The method of any one of Clauses 1-7, further comprising: receiving, from the network entity, an indication of the updated number of SRS ports.

Clause 9: The method of any one of Clauses 1-8, wherein the one or more of the SRS resources are transmitted using at least one of: spatial relation information configured with the downlink reference signal; or spatial relation information configured with a reference signal that is quasi co-located with the downlink reference signal.

Clause 10: The method of any one of Clauses 1-9, wherein: the configuration configures the UE with at least two SRS resource sets, each including one or more SRS resources; the report indicates a capability index associated with at least two downlink reference signals; and transmitting the one or more of the SRS resources comprises transmitting at least one SRS resource, from each of the at least two SRS resource sets.

Clause 11: The method of Clause 10, further comprising: updating the number of SRS ports, for a given SRS resource, based on: a maximum of a number of SRS ports that can be used for an individual SRS transmission or a maximum number of SRS ports that can be used for simultaneous SRS transmissions, if that SRS resource can be used for both single transmission and simultaneous transmissions; or a number of SRS ports corresponding to a capability index value included in the report.

Clause 12: The method of Clause 11, wherein: the PUSCH comprises a simultaneous PUSCH transmission; and the number of PUSCH ports is equal to the updated number of SRS ports, if the updated number of SRS ports is the maximum number of SRS ports that can be used for simultaneous SRS transmissions or the number of PUSCH ports corresponds to a subset of transmitted SRS ports.

Clause 13: The method of Clause 11, wherein: the PUSCH comprises a single PUSCH transmission; and the number of PUSCH ports corresponds to the updated number of SRS ports.

Clause 14: A method for wireless communications by a network entity, comprising: transmitting, for a UE, a configuration of one or more SRS resources for codebook-based PUSCH transmissions: receiving a report from the UE indicating a capability index associated with at least one downlink reference signal; receiving signals transmitted on one or more of the SRS resources with an updated number of SRS ports associated with the capability index, if spatial relation information of the one or more of the SRS resources is associated with the downlink reference signal; transmitting signaling scheduling the UE to transmit a PUSCH based on one of the SRS resources; and receiving the PUSCH transmitted with a number of PUSCH ports according to the updated number of SRS ports.

Clause 15: The method of Clause 14, wherein the capability index indicates a maximum number of uplink ports of a panel used to receive the at least one downlink reference signal.

Clause 16: The method of any one of Clauses 14-15, wherein the downlink reference signal comprises at least one of a SSB or a CSI-RS.

Clause 17: The method of any one of Clauses 14-16, wherein the one or more of the SRS resources are received with one or more SRS parameters determined based on the updated number of SRS ports.

Clause 18: The method of any one of Clauses 14-17, wherein: the updated number of SRS ports is less than a maximum number of SRS ports previously configured for the UE; and the one or more of the SRS resources are transmitted with fewer than the maximum number of SRS ports with previously used SRS parameters.

Clause 19: The method of any one of Clauses 14-18, further comprising: updating the number of SRS ports after a determined time after transmitting the report indicating the capability index.

Clause 20: The method of any one of Clauses 14-19, further comprising: transmitting an acknowledgment corresponding to the transmitted report; and updating the number of SRS ports after a determined after receiving the acknowledgment.

Clause 21: The method of any one of Clauses 14-20, further comprising: transmitting an indication of the updated number of SRS ports.

Clause 22: The method of any one of Clauses 14-21, wherein the one or more of the SRS resources are transmitted using at least one of: spatial relation information configured with the downlink reference signal; or spatial relation information configured with a reference signal that is quasi co-located with the downlink reference signal.

Clause 23: The method of any one of Clauses 14-22, wherein: the configuration configures the UE with at least two SRS resource sets, each including one or more SRS resources; the report indicates a capability index associated with at least two downlink reference signals; and the one or more of the SRS resources comprises at least one SRS resource, from each of the at least two SRS resource sets.

Clause 24: The method of Clause 23, further comprising: updating the number of SRS ports, for a given SRS resource, based on: a maximum of a number of SRS ports that can be used for an individual SRS transmission or a maximum number of SRS ports that can be used for simultaneous SRS transmissions, if that SRS resource can be used for both single transmission and simultaneous transmissions; or a number of SRS ports corresponding to a capability index value included in the report.

Clause 25: The method of Clause 24, wherein: the PUSCH comprises a simultaneous PUSCH transmission; and the number of PUSCH ports is equal to the updated number of SRS ports, if the updated number of SRS ports is the maximum number of SRS ports that can be used for simultaneous SRS transmissions or the number of PUSCH ports corresponds to a subset of transmitted SRS ports.

Clause 26: The method of Clause 24, wherein: the PUSCH comprises a single PUSCH transmission; and the number of PUSCH ports corresponds to the updated number of SRS ports.

Clause 27: An apparatus, comprising: a memory comprising executable instructions; and a processor configured to execute the executable instructions and cause the apparatus to perform a method in accordance with any one of Clauses 1-26.

Clause 28: An apparatus, comprising means for performing a method in accordance with any one of Clauses 1-26.

Clause 29: A non-transitory computer-readable medium comprising executable instructions that, when executed by a processor of an apparatus, cause the apparatus to perform a method in accordance with any one of Clauses 1-26.

Clause 30: A computer program product embodied on a computer-readable storage medium comprising code for performing a method in accordance with any one of Clauses 1-26.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications at a user equipment (UE), comprising:
  at least one processor;
  memory coupled with the at least one processor; and
  instructions stored in the memory and executable by the at least one processor to cause the apparatus to:
    receive, from a network entity, a configuration of one or more sounding reference signals (SRS) resources for codebook-based physical uplink shared channel (PUSCH) transmissions;
    transmit a report indicating a capability index associated with at least one downlink reference signal;
    transmit the one or more of the SRS resources with an updated number of SRS ports associated with the capability index, if spatial relation information of the one or more of the SRS resources is associated with the downlink reference signal;
    receive, from the network entity, signaling scheduling the UE to transmit a PUSCH based on one of the SRS resources; and
    transmit the PUSCH with a number of PUSCH ports according to the updated number of SRS ports.

2. The apparatus of claim 1, wherein the capability index indicates a maximum number of uplink ports of a panel used to receive the at least one downlink reference signal.

3. The apparatus of claim 1, wherein the downlink reference signal comprises at least one of a synchronization signal block (SSB) or a channel state information reference signal (CSI-RS).

4. The apparatus of claim 1, wherein transmitting the one or more of the SRS resources comprises transmitting the one or more SRS resources with one or more SRS parameters determined based on the updated number of SRS ports.

5. The apparatus of claim 1, wherein:
the updated number of SRS ports is less than a maximum number of SRS ports previously configured for the UE; and
transmitting the one or more of the SRS resources comprises transmitting fewer than the maximum number of SRS ports with previously used SRS parameters.

6. The apparatus of claim 1, wherein the instructions stored in the memory and executable by the at least one processor further cause the apparatus to update the number of SRS ports after a determined time after transmitting the report indicating the capability index.

7. The apparatus of claim 1, wherein the instructions stored in the memory and executable by the at least one processor further cause the apparatus to:
receive, from the network entity, an acknowledgment corresponding to the transmitted report; and
update the number of SRS ports after a determined after receiving the acknowledgment.

8. The apparatus of claim 1, wherein the instructions stored in the memory and executable by the at least one processor further cause the apparatus to receive, from the network entity, an indication of the updated number of SRS ports.

9. The apparatus of claim 1, wherein the one or more of the SRS resources are transmitted using at least one of:
spatial relation information configured with the downlink reference signal; or
spatial relation information configured with a reference signal that is quasi co-located with the downlink reference signal.

10. The apparatus of claim 1, wherein:
the configuration configures the UE with at least two SRS resource sets, each including one or more SRS resources;
the report indicates a capability index associated with at least two downlink reference signals; and
transmitting the one or more of the SRS resources comprises transmitting at least one SRS resource, from each of the at least two SRS resource sets.

11. The apparatus of claim 10, wherein the instructions stored in the memory and executable by the at least one processor further cause the apparatus to update the number of SRS ports, for a given SRS resource, based on:
a maximum of a number of SRS ports that can be used for an individual SRS transmission or a maximum number of SRS ports that can be used for simultaneous SRS transmissions, if that SRS resource can be used for both single transmission and simultaneous transmissions; or
a number of SRS ports corresponding to a capability index value included in the report.

12. The apparatus of claim 11, wherein:
the PUSCH comprises a simultaneous PUSCH transmission; and
the number of PUSCH ports is equal to the updated number of SRS ports, if the updated number of SRS ports is the maximum number of SRS ports that can be used for simultaneous SRS transmissions or the number of PUSCH ports corresponds to a subset of transmitted SRS ports.

13. The apparatus of claim 11, wherein:
the PUSCH comprises a single PUSCH transmission; and
the number of PUSCH ports corresponds to the updated number of SRS ports.

14. An apparatus for wireless communications at a network entity, comprising:
at least one processor;
memory coupled with the at least one processor; and
instructions stored in the memory and executable by the at least one processor to cause the apparatus to:
transmit, for a user equipment (UE), a configuration of one or more sounding reference signals (SRS) resources for codebook-based physical uplink shared channel (PUSCH) transmissions;
receive a report from the UE indicating a capability index associated with at least one downlink reference signal;
receive signals transmitted on one or more of the SRS resources with an updated number of SRS ports associated with the capability index, if spatial relation information of the one or more of the SRS resources is associated with the downlink reference signal;
transmit signaling scheduling the UE to transmit a PUSCH based on one of the SRS resources; and
receive the PUSCH transmitted with a number of PUSCH ports according to the updated number of SRS ports.

15. The apparatus of claim 14, wherein the capability index indicates a maximum number of uplink ports of a panel used to receive the at least one downlink reference signal.

16. The apparatus of claim 14, wherein the downlink reference signal comprises at least one of a synchronization signal block (SSB) or a channel state information reference signal (CSI-RS).

17. The apparatus of claim 14, wherein the one or more of the SRS resources are received with one or more SRS parameters determined based on the updated number of SRS ports.

18. The apparatus of claim 14, wherein:
the updated number of SRS ports is less than a maximum number of SRS ports previously configured for the UE; and
the one or more of the SRS resources are transmitted with fewer than the maximum number of SRS ports with previously used SRS parameters.

19. The apparatus of claim 14, wherein the instructions stored in the memory and executable by the at least one processor further cause the apparatus to update the number of SRS ports after a determined time after receiving the report indicating the capability index.

20. The apparatus of claim 14, wherein the instructions stored in the memory and executable by the at least one processor further cause the apparatus to:
transmit an acknowledgment corresponding to the received report; and
update the number of SRS ports after a determined after receiving the acknowledgment.

21. The apparatus of claim 14, wherein the instructions stored in the memory and executable by the at least one processor further cause the apparatus to transmit an indication of the updated number of SRS ports.

22. The apparatus of claim 14, wherein the one or more of the SRS resources are transmitted using at least one of:

spatial relation information configured with the downlink reference signal; or spatial relation information configured with a reference signal that is quasi co-located with the downlink reference signal.

23. The apparatus of claim 14, wherein:

the configuration configures the UE with at least two SRS resource sets, each including one or more SRS resources;

the report indicates a capability index associated with at least two downlink reference signals; and the one or more of the SRS resources comprises at least one SRS resource, from each of the at least two SRS resource sets.

24. The apparatus of claim 23, wherein the instructions stored in the memory and executable by the at least one processor further cause the apparatus to update the number of SRS ports, for a given SRS resource, based on:

a maximum of a number of SRS ports that can be used for an individual SRS transmission or a maximum number of SRS ports that can be used for simultaneous SRS transmissions, if that SRS resource can be used for both single transmission and simultaneous transmissions; or a number of SRS ports corresponding to a capability index value included in the report.

25. The apparatus of claim 24, wherein:

the PUSCH comprises a simultaneous PUSCH transmission; and the number of PUSCH ports is equal to the updated number of SRS ports, if the updated number of SRS ports is the maximum number of SRS ports that can be used for simultaneous SRS transmissions or the number of PUSCH ports corresponds to a subset of transmitted SRS ports.

26. The apparatus of claim 24, wherein:

the PUSCH comprises a single PUSCH transmission; and the number of PUSCH ports corresponds to the updated number of SRS ports.

27. A method for wireless communications by a user equipment (UE), comprising:

receiving, from a network entity, a configuration of one or more sounding reference signals (SRS) resources for codebook-based physical uplink shared channel (PUSCH) transmissions;

transmitting a report indicating a capability index associated with at least one downlink reference signal;

transmitting the one or more of the SRS resources with an updated number of SRS ports associated with the capability index, if spatial relation information of the one or more of the SRS resources is associated with the downlink reference signal;

receiving, from the network entity, signaling scheduling the UE to transmit a PUSCH based on one of the SRS resources; and transmitting the PUSCH with a number of PUSCH ports according to the updated number of SRS ports.

28. A method for wireless communications by a network entity, comprising:

transmitting, for a user equipment (UE), a configuration of one or more sounding reference signals (SRS) resources for codebook-based physical uplink shared channel (PUSCH) transmissions;

receiving a report from the UE indicating a capability index associated with at least one downlink reference signal;

receiving signals transmitted on one or more of the SRS resources with an updated number of SRS ports associated with the capability index, if spatial relation information of the one or more of the SRS resources is associated with the downlink reference signal;

transmitting signaling scheduling the UE to transmit a PUSCH based on one of the SRS resources; and receiving the PUSCH transmitted with a number of PUSCH ports according to the updated number of SRS ports.

* * * * *